US012663642B2

(12) United States Patent
Fletcher et al.

(10) Patent No.: US 12,663,642 B2
(45) Date of Patent: Jun. 23, 2026

(54) POSITION TRACKING SYSTEMS AND METHODS FOR HEAD-MOUNTED DISPLAY SYSTEMS WITH LED DROOP COMPENSATION

(71) Applicant: Valve Corporation, Bellevue, WA (US)

(72) Inventors: Evan Fletcher, Bellevue, WA (US); Jeffrey Walter Mucha, Bellevue, WA (US); Joshua Mark Hudman, Issaquah, WA (US); Alan Yates, Bellevue, WA (US); Gordon Wayne Stoll, Sammamish, WA (US); Jeffrey George Leinbaugh, Bellevue, WA (US); Charles Lohr, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 19/056,460

(22) Filed: Feb. 18, 2025

(65) Prior Publication Data

US 2025/0189783 A1 Jun. 12, 2025

Related U.S. Application Data

(63) Continuation of application No. 18/441,811, filed on Feb. 14, 2024, now Pat. No. 12,259,547, which is a
(Continued)

(51) Int. Cl.
G02B 27/00 (2006.01)
G02B 27/01 (2006.01)
(Continued)

(52) U.S. Cl.
CPC ..... G02B 27/0093 (2013.01); G02B 27/0172 (2013.01); G06F 3/012 (2013.01);
(Continued)

(58) Field of Classification Search
CPC . G02B 27/0172; G02B 27/0093; G06F 3/012; G06F 3/011; G06F 3/0304
See application file for complete search history.

(56) References Cited

U.S. PATENT DOCUMENTS

| 7,920,919 B1 | 4/2011 | Nabutovsky |
| 8,223,024 B1 | 7/2012 | Petrou |
| | (Continued) | |

FOREIGN PATENT DOCUMENTS

| CN | 106255916 A | 12/2016 |
| CN | 109477966 A | 3/2019 |
| | (Continued) | |

OTHER PUBLICATIONS

International Search Report and Written Opinion, Feb. 22, 2023, for PCT/US2022/044890, 20 pages.
(Continued)

*Primary Examiner* — Xuemei Zheng
(74) *Attorney, Agent, or Firm* — Seed Intellectual Property Law Group LLP

(57) ABSTRACT

Systems and methods for tracking the position of one or more head-mounted display (HMD) system components of an HMD system. The HMD components may carry a plurality of angle sensitive detectors or other types of detectors. The HMD system may be operative to detect corrupted position tracking samples, allowing such samples to be ignored, thereby improving the position tracking process. Control circuitry causes light sources to emit light according a specified pattern, and receives sensor data from the plurality of detectors. Control circuitry may process the sensor data, for example using machine learning or other techniques, to track a position of one or more HMD components.

20 Claims, 19 Drawing Sheets

Related U.S. Application Data continuation of application No. 17/954,076, filed on Sep. 27, 2022, now Pat. No. 11,933,976.

(60) Provisional application No. 63/249,348, filed on Sep. 28, 2021.

(51) Int. Cl.
    *G06F 3/01*        (2006.01)
    *G06F 3/03*        (2006.01)

(52) U.S. Cl.
    CPC ........ *G06F 3/0304* (2013.01); *G02B 27/0179* (2013.01); *G02B 2027/0187* (2013.01)

(56) References Cited

U.S. PATENT DOCUMENTS

| | | | |
|---|---|---|---|
| 8,970,571 B1 | 3/2015 | Wong et al. | |
| 10,554,886 B2 * | 2/2020 | Rydberg | A63F 13/212 |
| 11,042,028 B1 * | 6/2021 | Welch | G06T 15/08 |
| 2003/0086058 A1 * | 5/2003 | Percival | A61B 3/152 |
| | | | 351/208 |
| 2005/0224706 A1 | 10/2005 | von Rosenberg, Jr. | |
| 2005/0285129 A1 | 12/2005 | Jackson et al. | |
| 2007/0029949 A1 | 2/2007 | Null et al. | |
| 2007/0035706 A1 | 2/2007 | Margulis | |
| 2009/0095885 A1 | 4/2009 | Hager | |
| 2012/0140231 A1 | 6/2012 | Knox et al. | |
| 2013/0113973 A1 | 5/2013 | Miao | |
| 2015/0370333 A1 | 12/2015 | Ataee et al. | |
| 2016/0131761 A1 | 5/2016 | Yates et al. | |
| 2016/0341959 A1 | 11/2016 | Gibbs et al. | |
| 2017/0282062 A1 | 10/2017 | Black | |
| 2018/0361232 A1 | 12/2018 | Mallinson | |
| 2019/0046873 A1 | 2/2019 | Black | |
| 2021/0011289 A1 | 1/2021 | Fortin-Deschênes et al. | |
| 2021/0231962 A1 | 7/2021 | Hudman et al. | |
| 2021/0247842 A1 | 8/2021 | Hudman et al. | |

FOREIGN PATENT DOCUMENTS

| | | |
|---|---|---|
| DE | 102017211528 A1 | 1/2019 |
| WO | 2021150423 A1 | 7/2021 |
| WO | 2021158804 A1 | 8/2021 |

OTHER PUBLICATIONS

Xu, et al., "Pointing and Selection Methods for Text Entry in Augmented Reality Head-Mounted Displays," 2019 IEEE International Symposium on Mixed and Augmented Reality (ISMAR), Oct. 18, 2019, 10 pages.

* cited by examiner

*700*

START

PROVIDE FIRST HMD COMPONENT WITH PLURALITY OF ANGLE SENSITIVE DETECTORS *702*

PROVIDE SECOND HMD COMPONENT WITH PLURALITY OF LIGHT SOURCES *704*

CAUSE LIGHT SOURCES TO EMIT LIGHT *706*

RECEIVE DATA FROM ANGLE SENSITIVE DETECTORS *708*

OPTIONALLY RECEIVE DATA FROM IMU *710*

PROCESS RECEIVED DATA *712*

TRACK POSITION OF FIRST OR SECOND HMD COMPONENT BASED ON PROCESSED DATA *714*

END

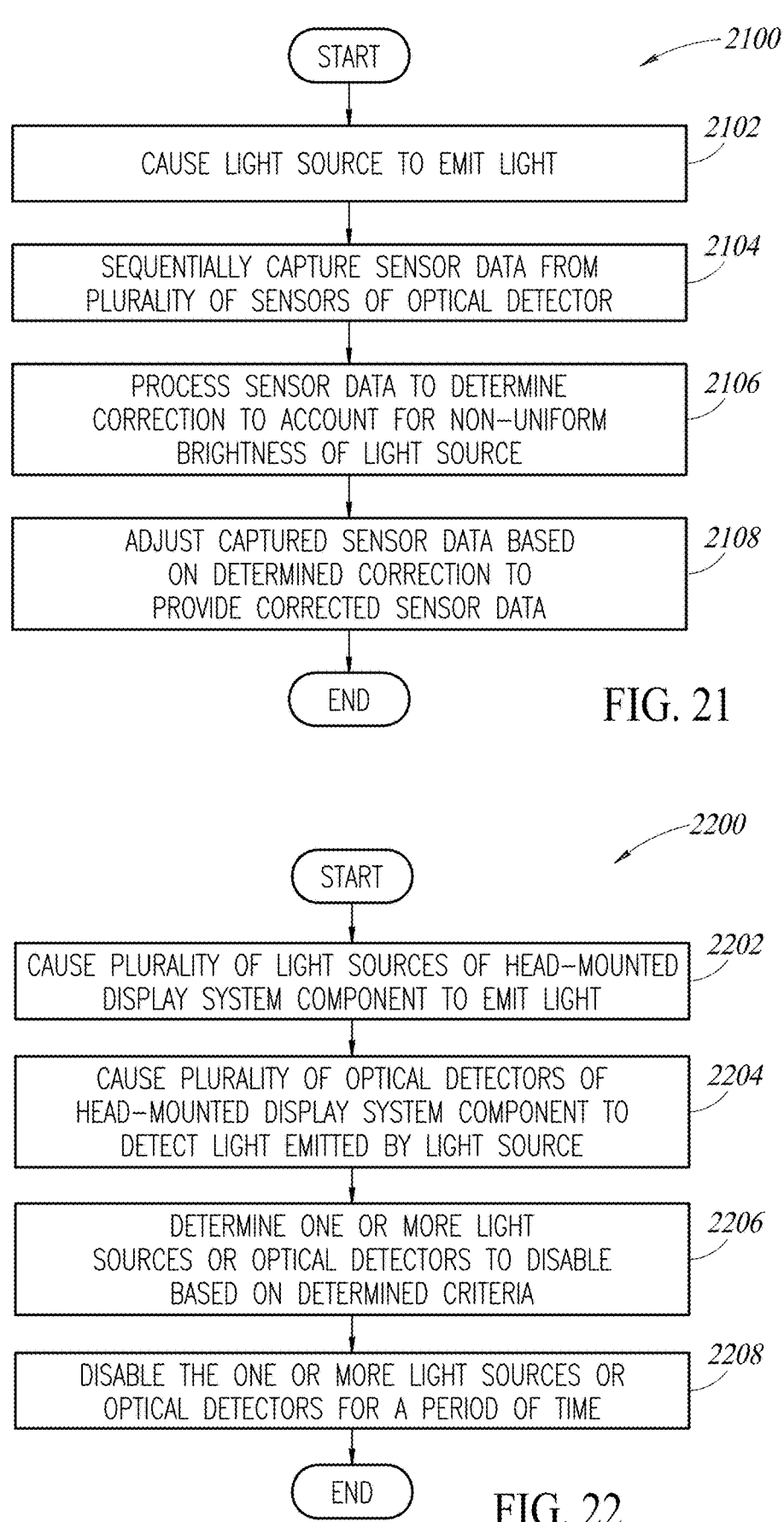

```
                    ┌─────────┐
                    │  START  │                              ⟋ 2100
                    └─────────┘
                         │
    ┌────────────────────────────────────────────┐  2102
    │       CAUSE LIGHT SOURCE TO EMIT LIGHT       │
    └────────────────────────────────────────────┘
                         │
    ┌────────────────────────────────────────────┐  2104
    │    SEQUENTIALLY CAPTURE SENSOR DATA FROM     │
    │   PLURALITY OF SENSORS OF OPTICAL DETECTOR   │
    └────────────────────────────────────────────┘
                         │
    ┌────────────────────────────────────────────┐  2106
    │        PROCESS SENSOR DATA TO DETERMINE      │
    │  CORRECTION TO ACCOUNT FOR NON-UNIFORM       │
    │        BRIGHTNESS OF LIGHT SOURCE            │
    └────────────────────────────────────────────┘
                         │
    ┌────────────────────────────────────────────┐  2108
    │      ADJUST CAPTURED SENSOR DATA BASED       │
    │        ON DETERMINED CORRECTION TO           │
    │         PROVIDE CORRECTED SENSOR DATA        │
    └────────────────────────────────────────────┘
                         │
                    ┌─────────┐
                    │   END   │           FIG. 21
                    └─────────┘
```

```
                                                  ⟋ 2200
                    ┌─────────┐
                    │  START  │
                    └─────────┘
                         │
    ┌────────────────────────────────────────────┐  2202
    │ CAUSE PLURALITY OF LIGHT SOURCES OF HEAD-MOUNTED │
    │   DISPLAY SYSTEM COMPONENT TO EMIT LIGHT     │
    └────────────────────────────────────────────┘
                         │
    ┌────────────────────────────────────────────┐  2204
    │    CAUSE PLURALITY OF OPTICAL DETECTORS OF   │
    │   HEAD-MOUNTED DISPLAY SYSTEM COMPONENT TO   │
    │   DETECT LIGHT EMITTED BY LIGHT SOURCE       │
    └────────────────────────────────────────────┘
                         │
    ┌────────────────────────────────────────────┐  2206
    │        DETERMINE ONE OR MORE LIGHT           │
    │  SOURCES OR OPTICAL DETECTORS TO DISABLE     │
    │        BASED ON DETERMINED CRITERIA          │
    └────────────────────────────────────────────┘
                         │
    ┌────────────────────────────────────────────┐  2208
    │   DISABLE THE ONE OR MORE LIGHT SOURCES OR   │
    │   OPTICAL DETECTORS FOR A PERIOD OF TIME     │
    └────────────────────────────────────────────┘
                         │
                    ┌─────────┐
                    │   END   │           FIG. 22
                    └─────────┘
```

POSITION TRACKING SYSTEMS AND METHODS FOR HEAD-MOUNTED DISPLAY SYSTEMS WITH LED DROOP COMPENSATION

BACKGROUND

Technical Field

The present disclosure generally relates to position tracking for objects, such as head-mounted display systems and controllers associated with head-mounted display systems.

Description of the Related Art

One current generation of virtual reality ("VR") or augmented reality ("AR") experiences is created using head-mounted displays ("HMDs"), which can be coupled to a stationary computer (such as a personal computer ("PC"), laptop, or game console), combined and/or integrated with a smart phone and/or its associated display, or self-contained. Generally, HMDs are display devices, worn on the head of a user, which has a small display device in front of one (monocular HMD) or each eye (binocular HMD). The display units are typically miniaturized and may include CRT, LCD, Liquid crystal on silicon (LCos), or OLED technologies, for example. A binocular HMD has the potential to display a different image to each eye. This capability is used to display stereoscopic images.

Demand for displays with heightened performance has increased with the development of smart phones, high-definition televisions, as well as other electronic devices. The growing popularity of virtual reality and augmented reality systems, particularly those using HMDs, has further increased such demand. Virtual reality systems typically envelop a wearer's eyes completely and substitute a "virtual" reality for the actual or physical view (or actual reality) in front of the wearer, while augmented reality systems typically provide a semi-transparent or transparent overlay of one or more screens in front of a wearer's eyes such that actual view is augmented with additional information, and mediated reality systems may similarly present information to a viewer that combines real-world elements with virtual elements. In many virtual reality and augmented reality systems, the movement of a wearer of such a head-mounted display may be tracked in various manners, such as via sensors in the head-mounted display, controllers, or external sensors, in order to enable the images being shown to reflect user movements and to allow for an interactive environment.

Position tracking allows an HMD system to estimate the position of one or more components relative to each other and the surrounding environment. Position tracking may utilize a combination of hardware and software to achieve the detection of the absolute position of components of an HMD system. Position tracking is an important technology for AR or VR systems, making it possible to track movement of HMDs (and/or controllers or other peripherals) with six degrees of freedom (6DOF).

Position tracking technology may be used to change the viewpoint of the user to reflect different actions like jumping or crouching, and may allow for an accurate representation of the user's hands and other objects in the virtual environment. Position tracking may also increase the connection between the physical and virtual environment by, for example, using hand position to move virtual objects by touch. Position tracking improves the 3D perception of the virtual environment for the user because of parallax, which helps with the perception of distance. Also, the positional tracking may help minimize reduce motion sickness caused by a disconnect between the inputs of what is being seen with the eyes and what is being felt by the user's ear vestibular system.

There are different methods of positional tracking. Such methods may include acoustic tracking, inertial tracking, magnetic tracking, optical tracking, combinations thereof, etc.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 21 is a flow diagram for a method of compensating for non-uniform brightness of light sources of a position tracking system of an HMD system, according to an example embodiment of the present disclosure.

FIG. 22 is a flow diagram for a method of adaptively enabling and disabling components (e.g., light sources, optical detectors) of a tracking subsystem of an HMD system, according to an example embodiment of the present disclosure.

DETAILED DESCRIPTION

Figure 1:
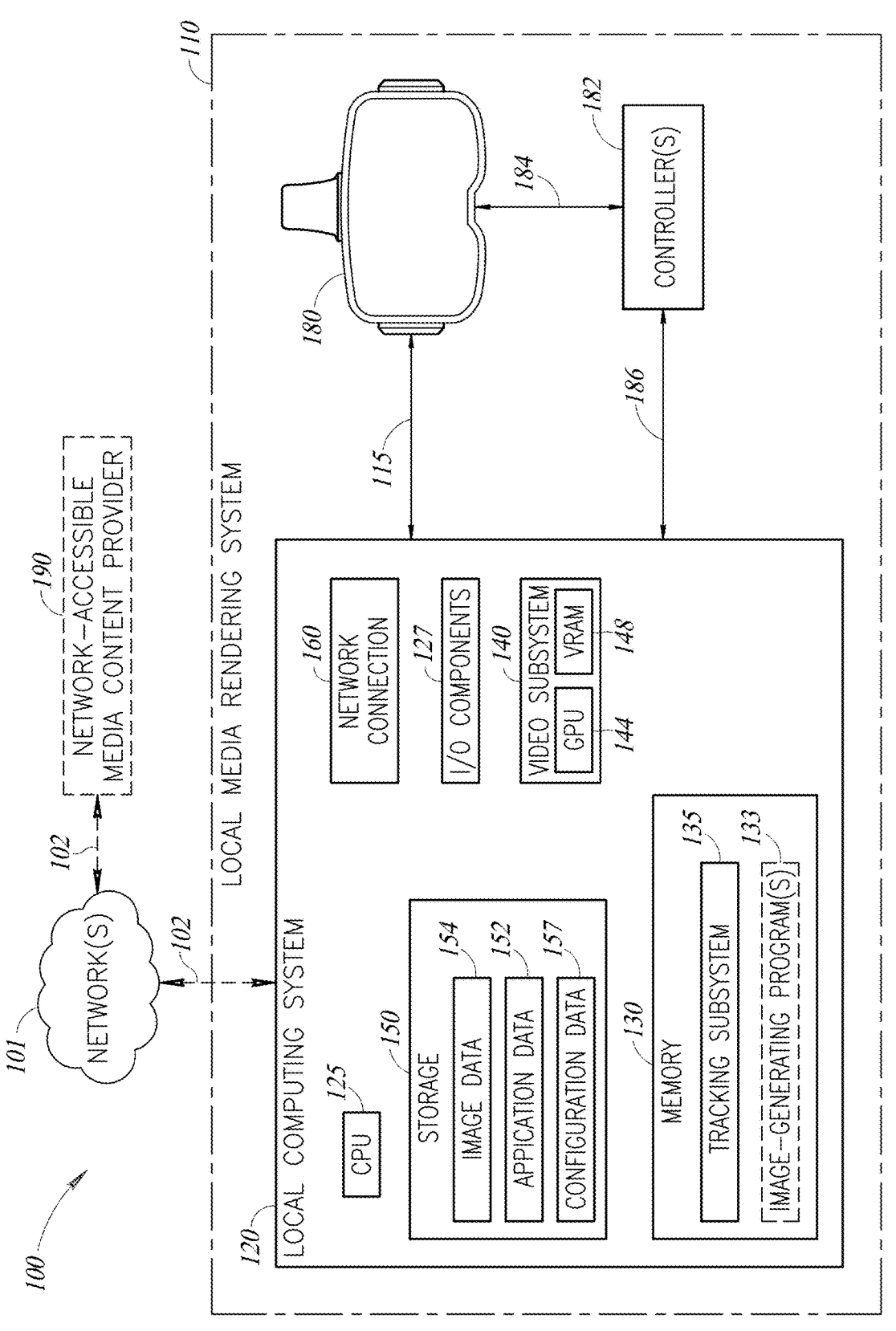
FIG. 1 is a schematic diagram of a networked environment that includes one or more systems suitable for performing at least some techniques described in the present disclosure, including embodiments of a tracking subsystem.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods for accurately tracking the position of components (e.g., HMD, controllers, peripherals) of a head-mounted display (HMD) system. In at least some implementations, the HMD includes a support structure that carries a forward facing camera ("forward camera" or "front camera") and a plurality of angle sensitive detectors or light sources. Similarly, one or more controllers may include a plurality of angle sensitive detectors or light detectors. In other implementations, the HMD does not include a forward camera. The forward camera may capture image sensor data in a forward camera field of view at a first frame rate (e.g., 30 Hz, 90 Hz). In at least some implementations, the HMD system may not include angle sensitive detectors, or may include other types of optical detectors (e.g., photodiodes). Thus, where appropriate, systems and methods described herein may utilize non-angle sensitive detectors or angle sensitive detectors.

In operation, one or more fixed or movable light sources (e.g., IR LEDs) may be caused to emit light, as discussed further below. The light sources may be coupled to an HMD, a controller, a fixed object (e.g., base station) located in the environment, etc. Each of the plurality of angle sensitive detectors captures sensor data in a respective plurality of angle sensitive detector fields of view at a second frame rate (e.g., 1000 Hz, 2000 Hz) which may be greater than the first frame rate of the forward camera (when present). In at least some implementations, the angle sensitive detector fields of view may be narrower than the forward camera field of view, although this is not required. For example, the forward camera may have a relatively wide forward camera field of view of 90°, 120°, or 150°, and each of the angle sensitive detectors may have relatively narrow sensor IC fields of view (e.g., 25°, 45°,) 75°. In at least some implementations, the angle sensitive detector fields of view may collectively cover at least a substantial portion the forward camera field of view, or even greater than the forward camera field of view, with each of the angle sensitive detector fields of view overlapping with different portions of the forward camera field of view.

In operation, at least one processor operatively coupled to a plurality of angle sensitive detectors may receive sensor data that captures light from a plurality of light sources (e.g., LEDs, lasers, other light sources). The at least one processor may process the received image sensor data to track a position of a component of the head-mounted display based at least in part on the processing of the received image sensor data. For example, the at least one processor may fuse the sensor data from the angle sensitive detectors to track one or more features present in an environment. The at least one processor may utilize machine learning techniques, solvers, or another methods to process the sensor data to determine the position (e.g., location, orientation, movement) of one or more components of the HMD system. In at least some implementations, the sensor data may be fused with sensor data from other sensors, such as sensor data from a forward camera or an inertial measurement unit (IMU) of an HMD system component. In at least some implementations, one or more scatter detection modules or "scatter detectors" may be used to detect when light has been scattered or reflected before reaching one or more angle sensitive detectors, and such light may be ignored by the tracking system since its angle does not accurately indicate the location of the light source from which the light was emitted. Using this technique, the accuracy of position tracking can be greatly improved. The various features of the implementations of the present disclosure are discussed in detail below with reference to the Figures.

Figure 2:
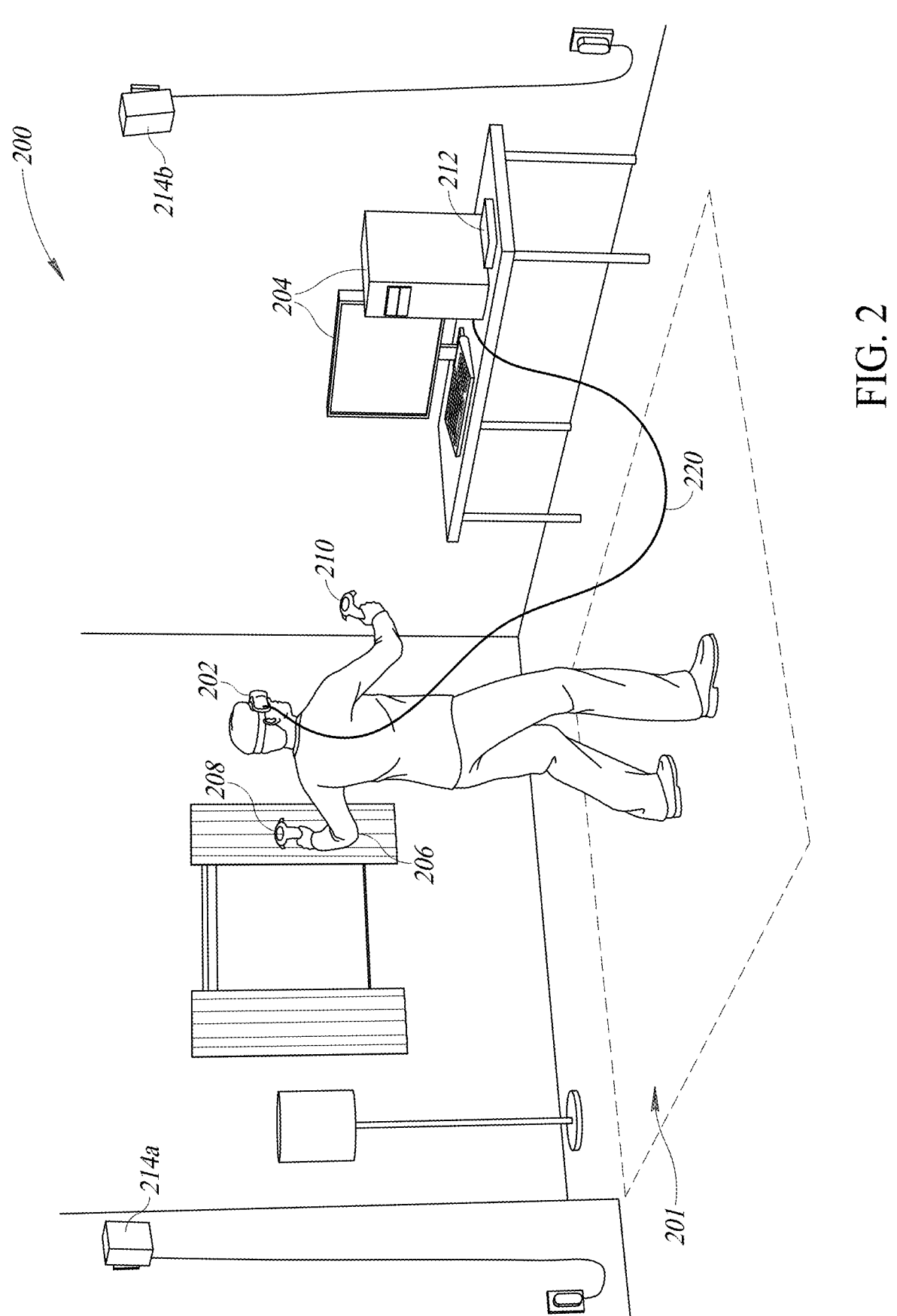
FIG. 2 is a diagram illustrating an example environment in which at least some of the described techniques are used with an example head-mounted display device that is tethered to a video rendering computing system and providing a virtual reality display to a user.

FIG. 1 is a schematic diagram of a networked environment 100 that includes a local media rendering (LMR) system 110 (e.g., a gaming system), which includes a local computing system 120, a display device 180 (e.g., an HMD device with two display panels, one for each eye), and one or more controllers 182 suitable for performing at least some techniques described herein. In the depicted embodiment of FIG. 1, the local computing system 120 is communicatively connected to the display device 180 via transmission link 115 (which may be wired or tethered, such as via one or more cables as illustrated in FIG. 2 (cable 220), or instead may be wireless). The controllers 182 may be coupled to the local computing system 120 or the display device 180 via suitable wired or wireless links 186 and 184, respectively. In other embodiments, the local computing system 120 may provide encoded image data for display to a panel display device (e.g., a TV, console or monitor) via a wired or wireless link, whether in addition to or instead of the HMD device 180, and the display devices each includes one or more addressable pixel arrays. In various embodiments, the local computing system 120 may include a general purpose computing system; a gaming console; a video stream processing device; a mobile computing device (e.g., a cellular telephone, PDA, or other mobile device); a VR or AR processing device; or other computing system.

In the illustrated embodiment, the local computing system 120 has components that include one or more hardware processors (e.g., centralized processing units, or "CPUs") 125, memory 130, various I/O ("input/output") hardware components 127 (e.g., a keyboard, a mouse, one or more gaming controllers, speakers, microphone, IR transmitter and/or receiver, etc.), a video subsystem 140 that includes one or more specialized hardware processors (e.g., graphics processing units, or "GPUs") 144 and video memory (VRAM) 148, computer-readable storage 150, and a network connection 160. Also in the illustrated embodiment, an embodiment of an tracking subsystem 135 executes in memory 130 in order to perform at least some of the described techniques, such as by using the CPU(s) 125 and/or GPU(s) 144 to perform automated operations that implement those described techniques, and the memory 130 may optionally further execute one or more other programs 133 (e.g., to generate video or other images to be displayed, such as a game program). As part of the automated operations to implement at least some techniques described herein, the tracking subsystem 135 and/or programs 133 executing in memory 130 may store or retrieve various types of data, including in the example database data structures of storage 150, in this example, the data used may include various types of image data information in database ("DB") 154, various types of application data in DB 152, various types of configuration data in DB 157, and may include additional information, such as system data or other information.

The LMR system 110 is also, in the depicted embodiment, communicatively connected via one or more computer networks 101 and network links 102 to an exemplary network-accessible media content provider 190 that may further provide content to the LMR system 110 for display, whether in addition to or instead of the image-generating programs 133. The media content provider 190 may include one or more computing systems (not shown) that may each have components similar to those of local computing system 120, including one or more hardware processors, I/O components, local storage devices and memory, although some details are not illustrated for the network-accessible media content provider for the sake of brevity.

It will be appreciated that, while the display device 180 is depicted as being distinct and separate from the local computing system 120 in the illustrated embodiment of FIG. 1, in certain embodiments some or all components of the local media rendering system 110 may be integrated or housed within a single device, such as a mobile gaming device, portable VR entertainment system, HMD device, etc. In such embodiments, transmission link 115 may, for example, include one or more system buses and/or video bus architectures.

As one example involving operations performed locally by the local media rendering system 120, assume that the local computing system is a gaming computing system, such that application data 152 includes one or more gaming applications executed via CPU 125 using memory 130, and that various video frame display data is generated and/or processed by the image-generating programs 133, such as in conjunction with GPU 144 of the video subsystem 140. In order to provide a quality gaming experience, a high volume of video frame data (corresponding to high image resolution for each video frame, as well as a high "frame rate" of approximately 60-180 of such video frames per second) is generated by the local computing system 120 and provided via the wired or wireless transmission link 115 to the display device 180.

It will also be appreciated that computing system 120 and display device 180 are merely illustrative and are not intended to limit the scope of the present disclosure. The computing system 120 may instead include multiple interacting computing systems or devices, and may be connected to other devices that are not illustrated, including through one or more networks such as the Internet, via the Web, or via private networks (e.g., mobile communication networks, etc.). More generally, a computing system or other computing node may include any combination of hardware or software that may interact and perform the described types of functionality, including, without limitation, desktop or other computers, game systems, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. The display device 180 may similarly include one or more devices with one or more display panels of various types and forms, and optionally include various other hardware and/or software components.

In addition, the functionality provided by the tracking subsystem 135 may in some embodiments be distributed in one or more components (e.g., local and remote computing systems, HMD, controller(s), base station(s)), and in some embodiments some of the functionality of the tracking subsystem 135 may not be provided and/or other additional functionality may be available. It will also be appreciated that, while various items are illustrated as being stored in memory or on storage while being used, these items or portions of them may be transferred between memory and other storage devices for purposes of memory management or data integrity. Thus, in some embodiments, some or all of the described techniques may be performed by hardware that include one or more processors or other configured hardware circuitry or memory or storage, such as when configured by one or more software programs (e.g., by the tracking subsystem 135 or it components) and/or data structures (e.g., by execution of software instructions of the one or more software programs and/or by storage of such software instructions and/or data structures). Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 2 illustrates an example environment 200 in which at least some of the described techniques are used with an example HMD device 202 that is coupled to a video rendering computing system 204 via a tethered connection 220 (or a wireless connection in other embodiments) to provide a virtual reality display to a human user 206. The user wears the HMD device 202 and receives displayed information via the HMD device from the computing system 204 of a simulated environment different from the actual physical environment, with the computing system acting as an image rendering system that supplies images of the simulated environment to the HMD device for display to the user, such as images generated by a game program and/or other software program executing on the computing system. The user is further able to move around within a tracked volume 201 of the actual physical environment 200 in this example, and may further have one or more I/O ("input/output") devices to allow the user to further interact with the simulated environment, which in this example includes hand-held controllers 208 and 210.

In the illustrated example, the environment 200 may include one or more base stations 214 (two shown, labeled base stations 214a and 214b) that may facilitate tracking of the HMD device 202 or the controllers 208 and 210. As the user moves location or changes orientation of the HMD device 202, the position of the HMD device is tracked, such as to allow a corresponding portion of the simulated environment to be displayed to the user on the HMD device, and the controllers 208 and 210 may further employ similar techniques to use in tracking the positions of the controllers (and to optionally use that information to assist in determining or verifying the position of the HMD device). After the tracked position of the HMD device 202 is known, corresponding information is transmitted to the computing system 204 via the tether 220 or wirelessly, which uses the tracked position information to generate one or more next images of the simulated environment to display to the user.

The optical tracking described herein may be used in combination with various methods of positional tracking including, but not limited to, acoustic tracking, inertial tracking, or magnetic tracking, among others.

In at least some implementations, at least one of the HMD device 202 and the controllers 208 and 210 may include one or more optical receivers or sensors that may be used to implement tracking functionality or other aspects of the present disclosure. In at least some implementations, at least one of the HMD device 202, the controllers 208 and 210, or other component may include one or more light sources (e.g., LEDs) which may emit light detected by one or more of the optical receivers. The light sources may be in a fixed position or may be on a component that is movable, such as an HMD device or controller.

In at least some implementations, in addition to or instead of generating fixed point light sources, the base stations 214 may each sweep an optical signal across the tracked volume 201. Depending on the requirements of each particular implementation, each base station 214 may generate more than one optical signal. For example, while a single base station 214 is typically sufficient for six-degree-of-freedom tracking, multiple base stations (e.g., base stations 214a, 214b) may be necessary or desired in some embodiments to provide robust room-scale tracking for HMD devices and peripherals. In this example, optical receivers, such as angle sensitive detectors or scatter detectors, are incorporated into the HMD device 202 and or other tracked objects, such as the controllers 208 and 210. In at least some implementations, optical receivers may be paired with an accelerometer and gyroscope inertial measurement unit ("IMU") on each tracked device to support low-latency sensor fusion.

In at least some implementations, each base station 214 includes two rotors that sweep a linear beam across the tracked volume 201 on orthogonal axes. At the start of each sweep cycle, the base station 214 may emit an omni-directional light pulse (referred to as a "sync signal") that is visible to all sensors on the tracked objects. Thus, each sensor computes a unique angular location in the swept volume by timing the duration between the sync signal and the beam signal. Sensor distance and orientation may be solved using multiple sensors affixed to a single rigid body.

The one or more sensors positioned on the tracked objects (e.g., HMD device 202, controllers 208 and 210) may comprise an optoelectronic device capable of detecting the modulated light from the rotor. For visible or near-infrared (NIR) light, silicon photodiodes and suitable amplifier/detector circuitry may be used. Because the environment 200 may contain static and time-varying signals (optical noise) with similar wavelengths to the signals of the base stations 214 signals, in at least some implementations the base station light may be modulated in such a way as to make it easy to differentiate from any interfering signals, and/or to filter the sensor from any wavelength of radiation other than that of base station signals. As discussed further below, in at least some implementations angle sensitive detectors are used to track one or more components of an HMD system, and one or more scatter detectors may be used to ignore light that may have been scattered or reflected prior to being detected by the optical detectors.

Inside-out tracking is also a type positional tracking that may be used to track the position of the HMD device 202 and/or other objects (e.g., controllers 208 and 210, tablet computers, smartphones). Inside-out tracking differs from outside-in tracking by the location of the cameras or other sensors used to determine the HMD component's position. For inside-out tracking, the camera or sensors are located on the HMD component, or object being tracked, while in outside-out tracking the camera or sensors are placed in a stationary location in the environment.

An HMD that utilizes inside-out tracking utilizes one or more sensors to "look out" to determine how its position changes in relation to the environment. When the HMD moves, the sensors readjust their place in the room and the virtual environment responds accordingly in real-time. This type of positional tracking can be achieved with or without markers placed in the environment. The cameras that are placed on the HMD observe features of the surrounding environment. When using markers, the markers are designed to be easily detected by the tracking system and placed in a specific area. With "markerless" inside-out tracking, the HMD system uses distinctive characteristics (e.g., natural features) that originally exist in the environment to determine position and orientation. The HMD system's algorithms identify specific images or shapes and use them to calculate the device's position in space. Data from accelerometers and gyroscopes can also be used to increase the precision of positional tracking.

Figure 3:
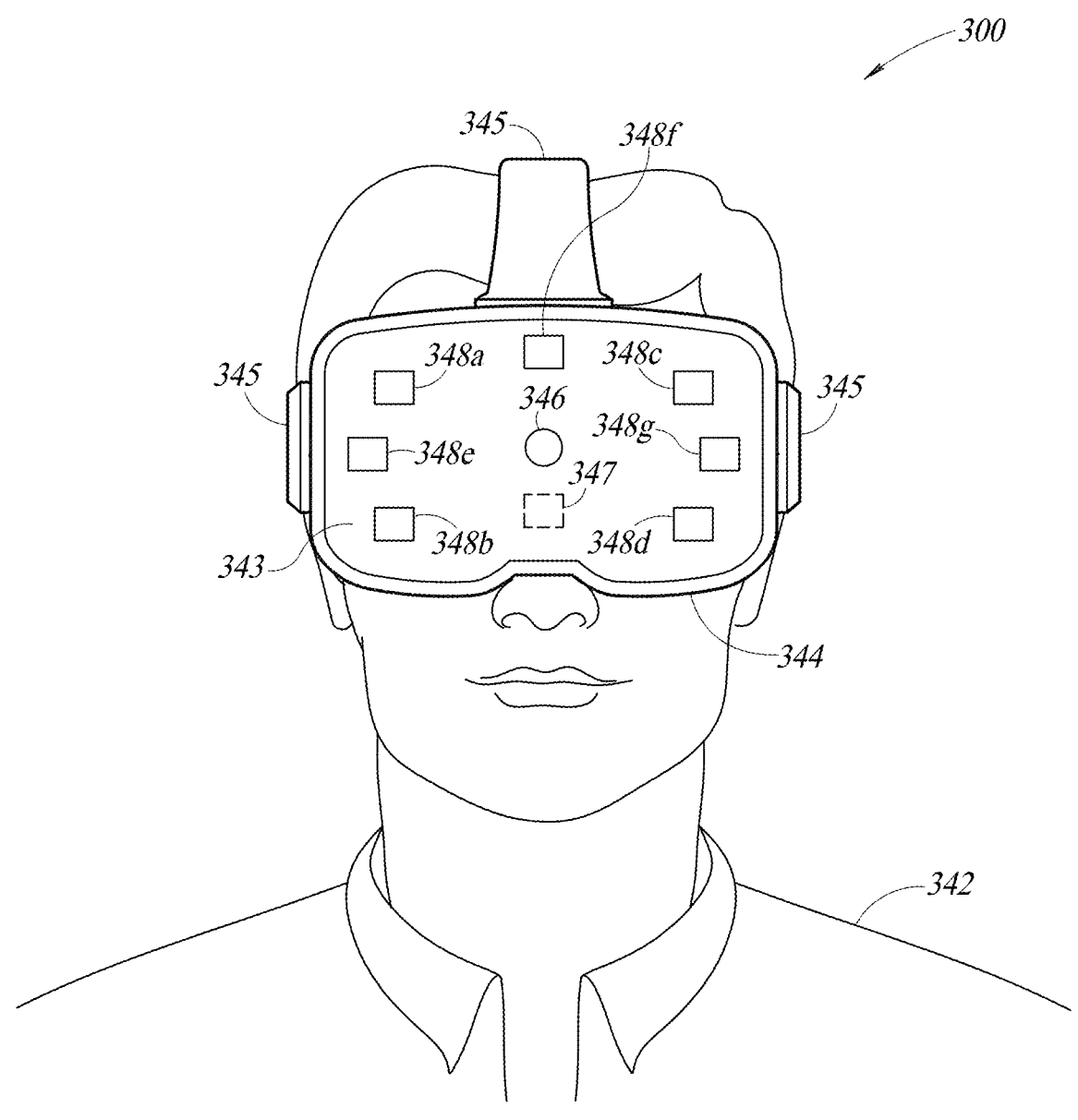
FIG. 3 is a pictorial diagram of an HMD device having binocular display subsystems and a plurality of angle sensitive detectors.

FIG. 3 shows information 300 illustrating a front view of an example HMD device 344 when worn on the head of a user 342. The HMD device 344 includes a front-facing structure 343 that supports a front-facing or forward camera 346 and a plurality of angle sensitive detectors 348a-348f (collectively 348) of one or more types, or other types of optical detectors. As one example, some or all of the angle sensitive detectors 348 may assist in determining the location and orientation of the device 344 in space, such as light sensors to detect and use light information emitted from one or more external devices (not shown, e.g., base stations 214 of FIG. 2, controllers). The angle sensitive detectors 348 may be any type of detector operative to detect the angle of arrival of light emitted from a light source. Non-limiting examples of angle sensitive detectors include photodiode detectors (e.g., bi-cell detectors, quadrant cell detectors), position sensitive detectors that use resistive sheets, etc.

As shown, the forward camera 346 and the angle sensitive detectors 348 are directed forward toward an actual scene or environment (not shown) in which the user 342 operates the HMD device 344. More generally, the angle sensitive detectors 348 may be directed toward other areas (e.g., upward, downward, left, right, rearward) to detect light from various sources, such as controllers (e.g., held by the user 342) or objects mounted at various locations (e.g., wall, ceiling). The actual physical environment may include, for example, one or more objects (e.g., walls, ceilings, furniture, stairs, cars, trees, tracking markers, light sources, or any other types of objects). The particular number of sensors 348 may be fewer (e.g., 2, 4) or more (e.g., 10, 20, 30, 40) than the number of sensors depicted. The HMD device 344 may further include one or more additional components that are not attached to the front-facing structure (e.g., are internal to the HMD device), such as an IMU (inertial measurement unit) 347 electronic device that measures and reports the HMD device's 344 specific force, angular rate, and/or the magnetic field surrounding the HMD device (e.g., using a combination of accelerometers and gyroscopes, and optionally, magnetometers). The HMD device 344 may further include additional components that are not shown, including one or more display panels and optical lens systems that are oriented toward eyes (not shown) of the user and that optionally have one or more attached internal motors to change the alignment or other positioning of one or more of the optical lens systems and/or display panels within the HMD device.

The illustrated example of the HMD device 344 is supported on the head of user 342 based at least in part on one or more straps 345 that are attached to the housing of the HMD device 344 and that extend wholly or partially around the user's head. While not illustrated here, the HMD device 344 may further have one or more external motors, such as attached to one or more of the straps 345, and automated corrective actions may include using such motors to adjust such straps in order to modify the alignment or other positioning of the HMD device on the head of the user. It will be appreciated that HMD devices may include other support structures that are not illustrated here (e.g., a nose piece, chin strap, etc.), whether in addition to or instead of the illustrated straps, and that some embodiments may include motors attached one or more such other support structures to similarly adjust their shape and/or locations to modify the alignment or other positioning of the HMD device on the head of the user. Other display devices that are not affixed to the head of a user may similarly be attached to or part of one or structures that affect the positioning of the display device, and may include motors or other mechanical actuators in at least some embodiments to similarly modify their shape and/or locations to modify the alignment or other positioning of the display device relative to one or more pupils of one or more users of the display device.

Figure 4:
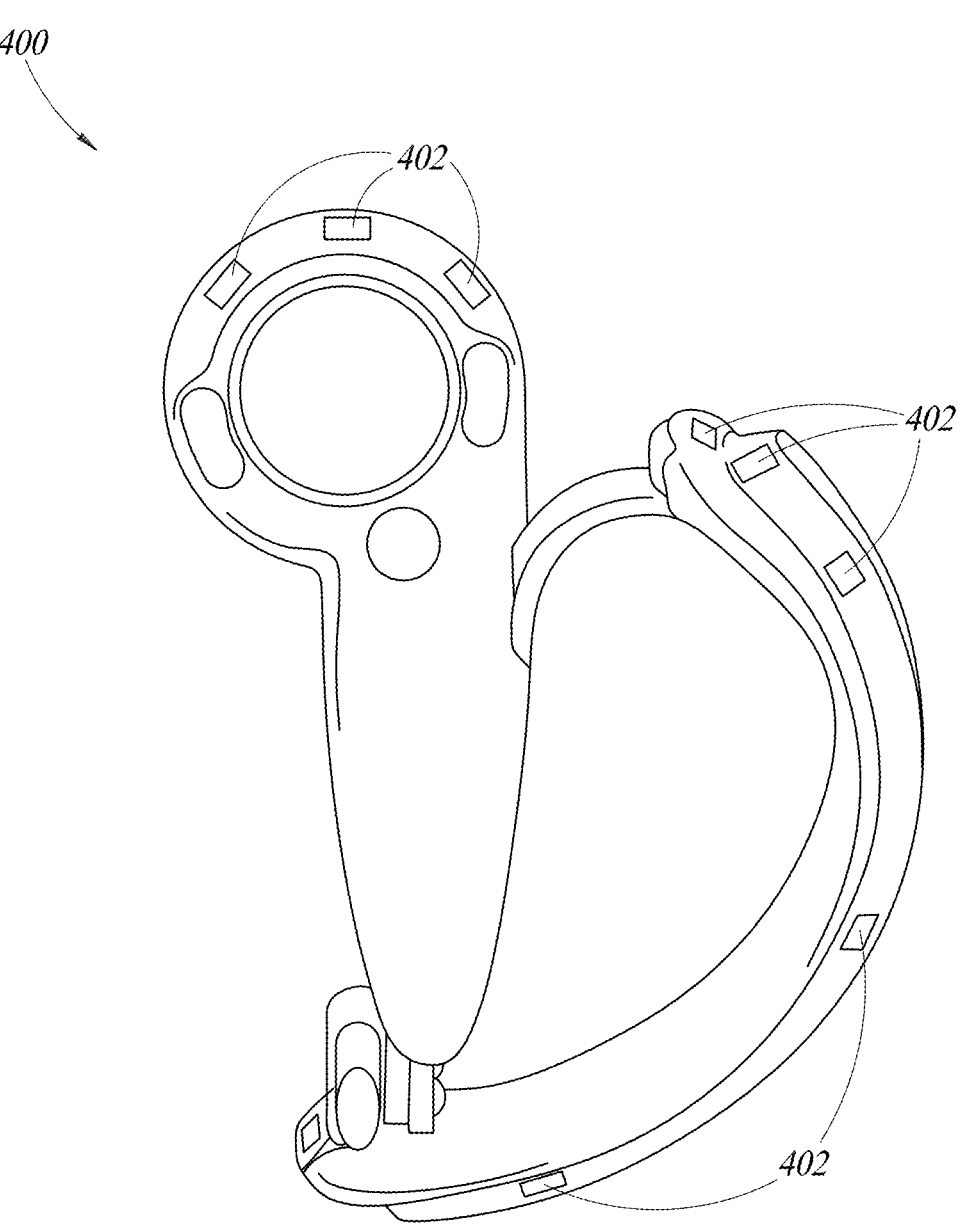
FIG. 4 is a pictorial diagram of a controller that may be used with an HMD device.

FIG. 4 shows an example of a hand controller 400 in more detail. In practice, an HMD system may include two hand controllers similar or identical to the hand controller 400 of FIG. 4, which may be similar or identical to the controllers 182, 208 and 210 discussed above. As shown, the controller 400 has various surfaces on which angle sensitive detectors 402 are positioned. The angle sensitive detectors 402 are arranged to receive optical signals from various different directions. The controller 400 may have buttons, sensors, lights, controls, knobs, indicators, displays, etc., allowing interaction by the user in various ways. Further, as discussed above, in at least some implementations, one of the controller 400 and HMD device 344 may include a plurality of light sources and the other of the controller and HMD device may include a plurality of angle sensitive detectors or other types of detectors or sensors. The techniques described herein may be used for various types of position tracking and are not limited to HMDs, controllers, etc.

Figure 5:
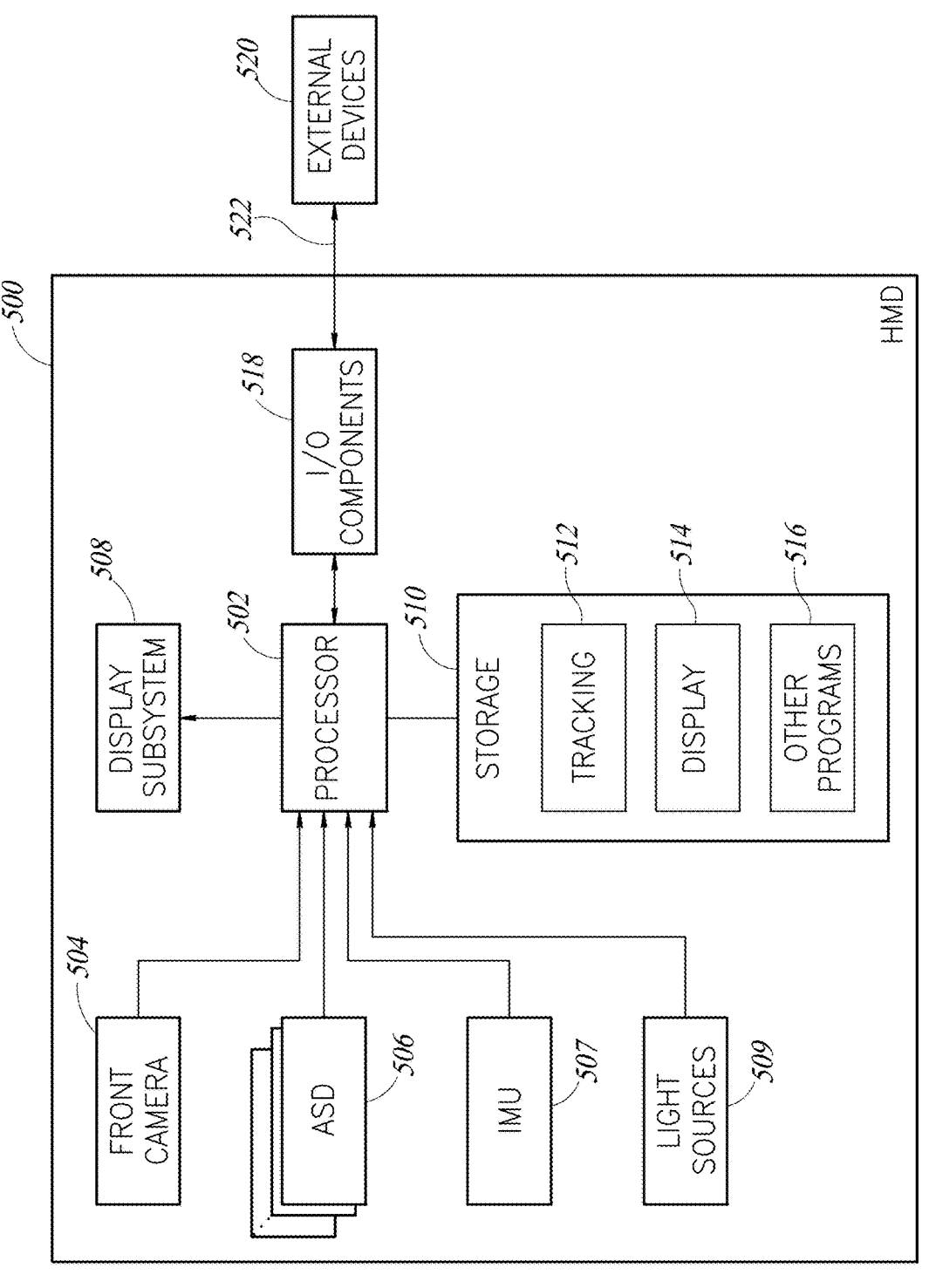
FIG. 5 is a schematic block diagram of an HMD device, according to an example embodiment of the present disclosure.

FIG. 5 shows a schematic block diagram of an HMD device 500 according to one or more implementations of the present disclosure. The HMD device 500 may be similar or identical to the HMD devices discussed elsewhere herein. Thus, the discussion above with regard to the HMD devices may also apply to the HMD device 500. Further, at least some of the components of the HMD device 500 may be present in other components of an HMD system, such as controllers, base stations, etc. Thus, at least some of the description below may be applicable to such other components.

The HMD device 500 includes a processor 502, a front-facing or forward camera 504, a plurality of angle sensitive detectors 506 (e.g., quad-cell photodiodes, position sensitive detectors), and optionally includes an IMU 507 or a plurality of light sources 509. In some implementation, the HMD device 500 may include one of angle sensitive detectors or light sources, and other components (e.g., controllers, base stations) may include the other of angle sensitive detectors or light sources. As discussed below, in at least some implementations the HMD device 500 may include one or more scatter detection modules or scatter detectors, which may be used to detect whether light received by one or more of the angle sensitive detectors has been scattered or reflected, and therefore should be ignored. The HMD device 500 may include a display subsystem 508 (e.g., two displays and corresponding optical systems). The HMD device 500 may also include a nontransitory data storage 510 that may store instructions or data for position tracking 512, instructions or data for display functionality 514 (e.g., games), and/or other programs 516. The HMD system 500 may include some or allow the functionality of the local computing system 120 or media content provider 190 shown in FIG. 1 and discussed above.

The HMD device 500 may also include various I/O components 518, which may include one or more user interfaces (e.g., buttons, touch pads, speakers), one or more wired or wireless communications interfaces, etc. As an example, the I/O components 518 may include a communications interface that allows the HMD device 500 to communicate with an external device 520 over a wired or wireless communications link 522. As non-limiting examples, the external device 520 may include a host computer, a server, a mobile device (e.g., smartphone, wearable computer), controllers, etc. The various components of the HMD device 500 may be housed in a single housing, may be housed in a separate housing (e.g., host computer), or any combinations thereof.

It will be appreciated that the illustrated computing systems and devices are merely illustrative and are not intended to limit the scope of the present disclosure. For example, HMD 500 and/or external devices 520 may be connected to other devices that are not illustrated, including through one or more networks such as the Internet or via the Web. More generally, such a computing system or device may comprise any combination of hardware that can interact and perform the described types of functionality, such as when programmed or otherwise configured with appropriate software, including without limitation desktop computers, laptop computers, slate computers, tablet computers or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated systems 500 and 520 may include executable software instructions and/or data structures in at least some embodiments, which when loaded on and/or executed by particular computing systems or devices, may be used to program or otherwise configure those systems or devices, such as to configure processors of those systems or devices. Alternatively, in other embodiments, some or all of the software systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity.

Thus, in at least some embodiments, the illustrated systems are software-based systems including software instructions that, when executed by the processor(s) and/or other processor means, program the processor(s) to automatically perform the described operations for that system. Furthermore, in some embodiments, some or all of the systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Figure 6:
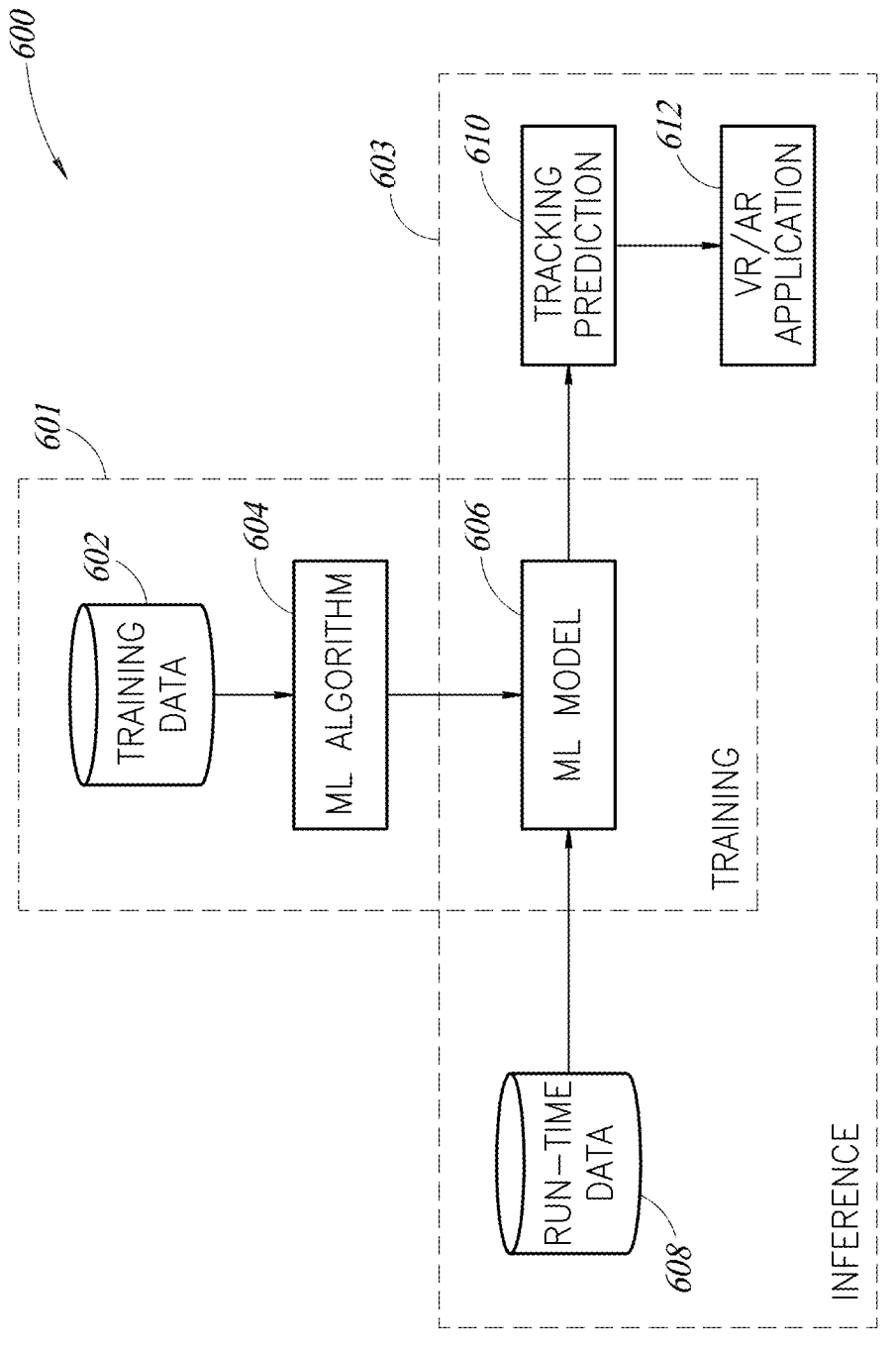
FIG. 6 is a schematic diagram of an environment in which machine learning techniques may be used to implement a tracking subsystem of an HMD device, according to one non-limiting illustrated implementation.

FIG. 6 is a schematic diagram of an environment 600 in which machine learning techniques may be used to implement a tracking subsystem to track an HMD device, one or more controllers, or other components, such as the tracking subsystems discussed herein, according to one non-limiting illustrated implementation. The environment 600 includes a model training portion 601 and an inference portion 603. In the training portion 601, training data 602 is fed into a machine learning algorithm 604 to generate a trained machine learning model 606. The training data may include, for example, labeled data from the angle sensitive detectors that specify the position and/or orientation of a particular object relative to one or more light sources (e.g., LEDs), labeled or unlabeled scatter detector data (discussed below), or other types of data. As a non-limiting example, in an embodiment that includes a component (e.g., HMD, controller) with 30 angle sensitive detectors, each training sample may include the output from each or a subset of the angle sensitive detectors, a known or inferred position or orientation of a component, and information about the position or direction of one or more light sources. As discussed below, each angle sensitive detector may output a single data point (e.g., angle), or may output multiple data points, such as two or four signals that are each indicative of the power or intensity of the light received at a particular active element (e.g., sub-detector or cell, resistive sheet, etc.) of the angle sensitive detector. The data may also include data from one or more scatter detectors, such as the scatter detectors discussed below. Such data may include polarization information (e.g., type or degree of polarization), information regarding whether detected light has been scattered, or other types of data.

The training data 602 may be obtained from a plurality of users and/or from a single user of an HMD system. The training data 602 may be obtained in a controlled environment and/or during actual use by users ("field training"). Further, in at least some implementations, the model 606 may be updated or calibrated from time-to-time (e.g., periodically, continuously, after certain events) to provide accurate position tracking predictions.

In the inference portion 603, run-time data 608 is provided as input to the trained machine learning model 606, which generates position tracking predictions 610. Continuing with the above example, the output data (e.g., intensity data, angle data) of the angle sensitive detectors, optionally information about one or more light sources, and optionally information from one or more scatter detectors, may be provided as input to the trained machine learning model 606, which may process the data to predict the position of the component. The tracking predictions 610 may then be provided to one or more components associated with an HMD device, such as, for example, one or more VR or AR applications, one or more display or rendering modules, one or more mechanical controls, one or more additional position tracking subsystems, etc.

The machine learning techniques employed to implement the features discussed herein may include any type of suitable structures or techniques. As non-limiting examples, the machine learning model 606 may include one or more of decision trees, statistical hierarchical models, support vector machines, artificial neural networks (ANNs) such as convolutional neural networks (CNNs) or recurrent neural networks (RNNs) (e.g., long short-term memory (LSTM) networks), mixture density networks (MDNs), hidden Markov models, or others can be used. In at least some implementations, such as implementations that utilize an RNN, the machine learning model 606 may utilize past input (memory, feedback) information to predict position of one or more HMD components. Such implementations may advantageously utilize sequential data to determine motion information or previous position predictions, which may provide more accurate real-time position predictions.

Figure 7:
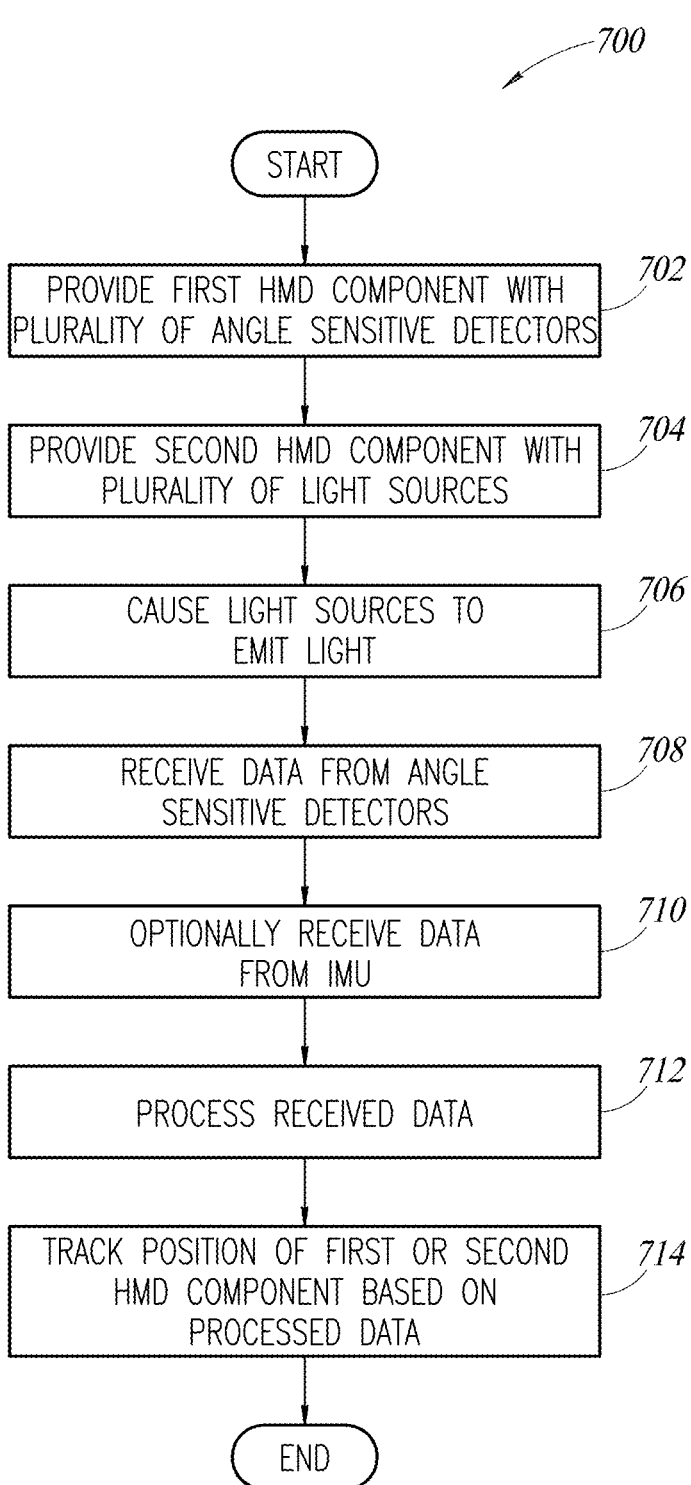
FIG. 7 is a flow diagram for a method of operating a position tracking system of an HMD system to track the position, orientation and/or movement of a component of the HMD system during use, according to an example embodiment of the present disclosure.

FIG. 7 is a flow diagram for an example method 700 of operating an HMD system to track the position of an HMD component during use. The method 700 may be performed by, for example, the position tracking system or module 512 of the HMD system 500 shown in FIG. 5. As discussed above, the method 700 may be used to track the position of any component, such as HMD device, one or more controllers, etc.

The illustrated implementation of the method 700 begins at act 702, wherein a first HMD system component having a plurality of angle sensitive detectors is provided. The plurality of angle sensitive detectors may be operative to detect light emitted from one or more light sources that may be fixedly positioned (e.g., mounted to a wall or ceiling) or movable (e.g., coupled to an HMD or controller). In operation, each of the plurality of angle sensitive detectors captures sensor data in a respective plurality of angle sensitive detector fields of view at a frame rate. The sensor data may comprise any type of data that is usable by control circuitry (e.g., a processor) to detect the presence and direction of a light source relative to the angle sensitive detector. In at least some implementations, each of the angle sensitive detectors may comprise one or more sensors (e.g., photodiodes) having image sensing circuitry and image processing circuitry thereon. The angle sensitive detectors may output relatively raw data (e.g., light intensity or power data) or processed data (e.g., angle of incidence data).

At 704, a second HMD system component may be provided that includes a plurality of light sources (e.g., near-IR LEDs). The second HMD system component may comprise a controller, an HMD device, or a light source that is positioned in a fixed location (e.g., ceiling, wall), for example.

At 706, at least one processor of the HMD system may cause the light sources to emit light. The light sources may be illuminated in a manner in which the angle sensitive detectors may each detect light from a single light source at a time or, more generally, in a manner in which the system may be able to determine from which light source that light detected by an angle sensitive detector was received. This may be achieved by modulating or multiplexing the illumination of the light sources using any suitable type of technology, such as time multiplexing, wavelength multiplexing, frequency multiplexing, polarization multiplexing, or other techniques that allow the system to know the source of light received from each of the angle sensitive detectors during use.

As an example of time multiplexing, the at least one processor may illuminate only a subset (e.g., one, two, four) of the light sources at a time. For instance, the at least one processor may sequentially illuminate the light sources, one subset at a time, and collect sensor data responsive to each of the light sources.

As an example of wavelength multiplexing, different subsets of the light sources may emit different wavelengths of light, and different subsets of the angle sensitive detectors may operative to sense the different wavelengths of light. Thus, light sources having differing wavelengths may be illuminated simultaneously and detected by the corresponding wavelength-sensitive detectors.

As an example of frequency multiplexing, subsets of the light sources may be illuminated at determined patterns or frequencies that are detectable by the angle sensitive detectors to identify the particular source of the light of the light.

As an example of polarization multiplexing, subsets of the light sources may be polarized differently (e.g., linear, circular), and corresponding subsets of the angle sensitive detectors may be configured to detect certain polarized light (e.g., using polarizers that pass light having the corresponding polarization), which allows multiple light sources to be illuminated simultaneously.

Other example techniques for illuminating the light sources may include one or more of frequency or wavelength division multiple access (FDMA or WDMA), time division multiple access (TDMA), code division multiple access (CDMA), and orthogonal frequency division multiple access (OFDMA). In at least some implementations, the illumination patterns or schemes may be configured to be orthogonal with respect to one or more of time, wavelength, or a frequency of an electrical system (e.g., 120 Hz, which is twice the 60 Hz frequency used in the United States' electrical systems, or 100 Hz, which is twice the 50 Hz frequency which is used in Europe's electrical systems). Further, the modulating schemes may be applied to the amplitude of the light of each individual marker or LED, or to one or more groups of two or more markers or LEDs, or to any combinations thereof. In at least some implementations, two or more of the light emitting components, the light detecting components, or the processing components (e.g., host system) may be synchronized with each other, which may provide further advantages, e.g., during use of CDMA techniques, etc.

At 708, at least one processor associated with the HMD system may receive sensor data from the plurality of angle sensitive detectors. As noted above, for each angle sensitive detector, the sensor data may be indicative of the angle of arrival of light emitted from a known light source. At 710, the at least one processor associated with the HMD system may optionally receive sensor data from an inertial measurement unit (IMU) that are operative to provide inertial tracking capabilities or sensor data from one or more additional sensors.

At 712, the at least one processor associated with the HMD system may process the received sensor data. For example, the at least one processor may fuse some or all of the sensor data together to track one or more features present in an environment in which the HMD system is operated. The sensor data may include sensor data from the plurality of angle sensitive detectors, and optionally sensor data from an IMU or from a camera. The at least one processor may process the sensor data using a machine learning model (e.g., model 606) or another solver, for example. As discussed further below, in at least some implementations the at least one processor may ignore data from one or more sensors determined to have likely received light that has been scattered or reflected.

At 714, the at least one processor associated with the HMD system may track the position (e.g., location, orientation, or movement) of the component of the HMD system in real-time during use of the HMD system by a user in the environment. The method 700 may continue during operation of the HMD to continuously track the position of the component of the HMD system, as discussed above.

Figure 8:
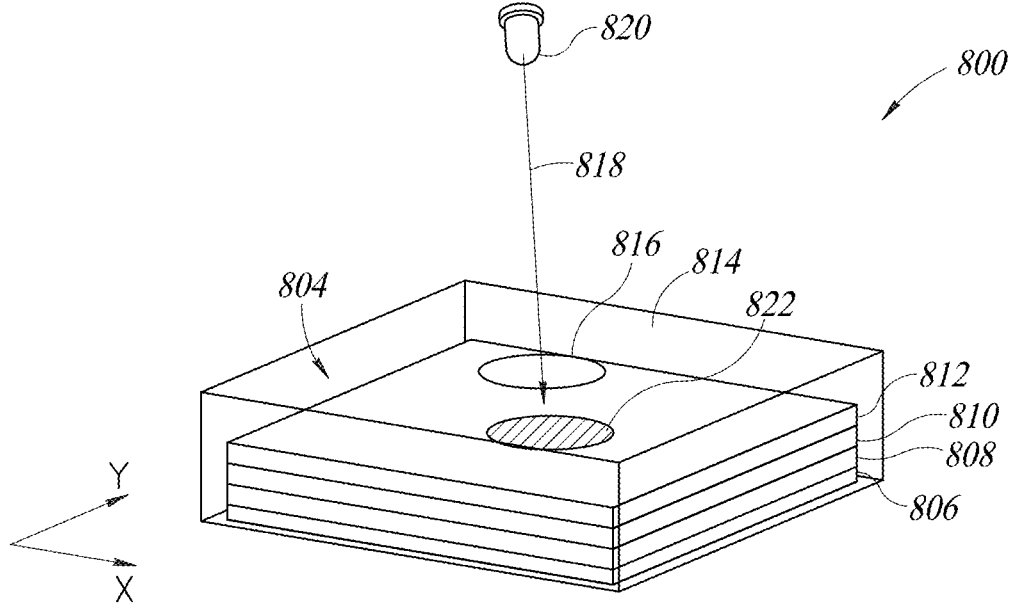
FIG. 8 shows a perspective view of an example angle sensitive detector that may be used in one or more of the implementations of the present disclosure.

FIG. 8 shows a perspective view of an example angle sensitive detector 800 that may be used in one or more of the implementations of the present disclosure. In this example, the angle sensitive detector 800 comprises an angle-sensitive photodiode structure 804. The angle-sensitive photodiode structure 804 includes a photodiode 806, a second linear polarizer 808, a spatially-varying polarizer 810 and a first linear polarizer 812. The photodiode 806 may be any device that receives light, determines an intensity associated with the light and outputs a signal (or data) representative of the intensity. The first and second linear polarizers 812, 808 may each be any type of light filter on which light impinges. The first and second linear polarizers 812, 808 may output a linearly polarized component (e.g., vertically polarized or horizontally polarized) of the impinging light and filter out (e.g., reflect or reject, absorb) other components of the impinging light.

In at least some implementations, the spatially varying polarizer 810 may be formed of a multi-twist retarder (MTR), which is a waveplate-like retardation film that provides precise and customized levels of broadband, narrowband or multiple band retardation in a single thin film. More specifically, MTR comprises two or more twisted liquid crystal (LC) layers on a single substrate and with a single alignment layer. Subsequent LC layers are aligned directly by prior layers, allowing simple fabrication, achieving automatic layer registration, and resulting in a monolithic film with a continuously varying optic axis.

The spatially varying polarizer 810 may comprise a wave retarder that is formed of birefringent materials. Birefringence is the property of a material that has a refractive index that depends on the polarization and propagation direction of light. The wave retarder alters the polarization state or phase of light traveling through the wave retarder. The wave retarder may have a slow axis (or extraordinary axis) and a fast axis (ordinary axis). As polarized light travels through the wave retarder, the light along the fast axis travels more quickly than along the slow axis.

The second linear polarizer 808, spatially-varying polarizer 810 and first linear polarizer 812 may be stacked on the photodiode 806 as shown in FIG. 8 and consecutively layered on the photodiode 806. It is noted that although the polarizers 812, 808 are described herein as linear polarizers, in various embodiments the polarizers 812, 808 may be non-linear polarizers and may, for example, be elliptical or circular polarizers. The polarizers 812, 808 may have the same light filtering properties and may similarly or identically reject or pass through light having particular polarizations. In this simplified example, the angle sensitive detector 800 includes a cover 814 that has an aperture 816 therein that allows light 818 from a light source 820 to pass therethrough. As shown, the light 818 that passes through the aperture 816 forms a light spot 822 that can be electrically characterized to determine the angle of the light 818, and therefore the angle of the light source 820, relative to the angle sensitive detector 800. As discussed below, the systems and methods of the present disclosure may utilize a plurality of light sources and angle sensitive detectors to determine the position of components of an HMD system.

Figure 9:
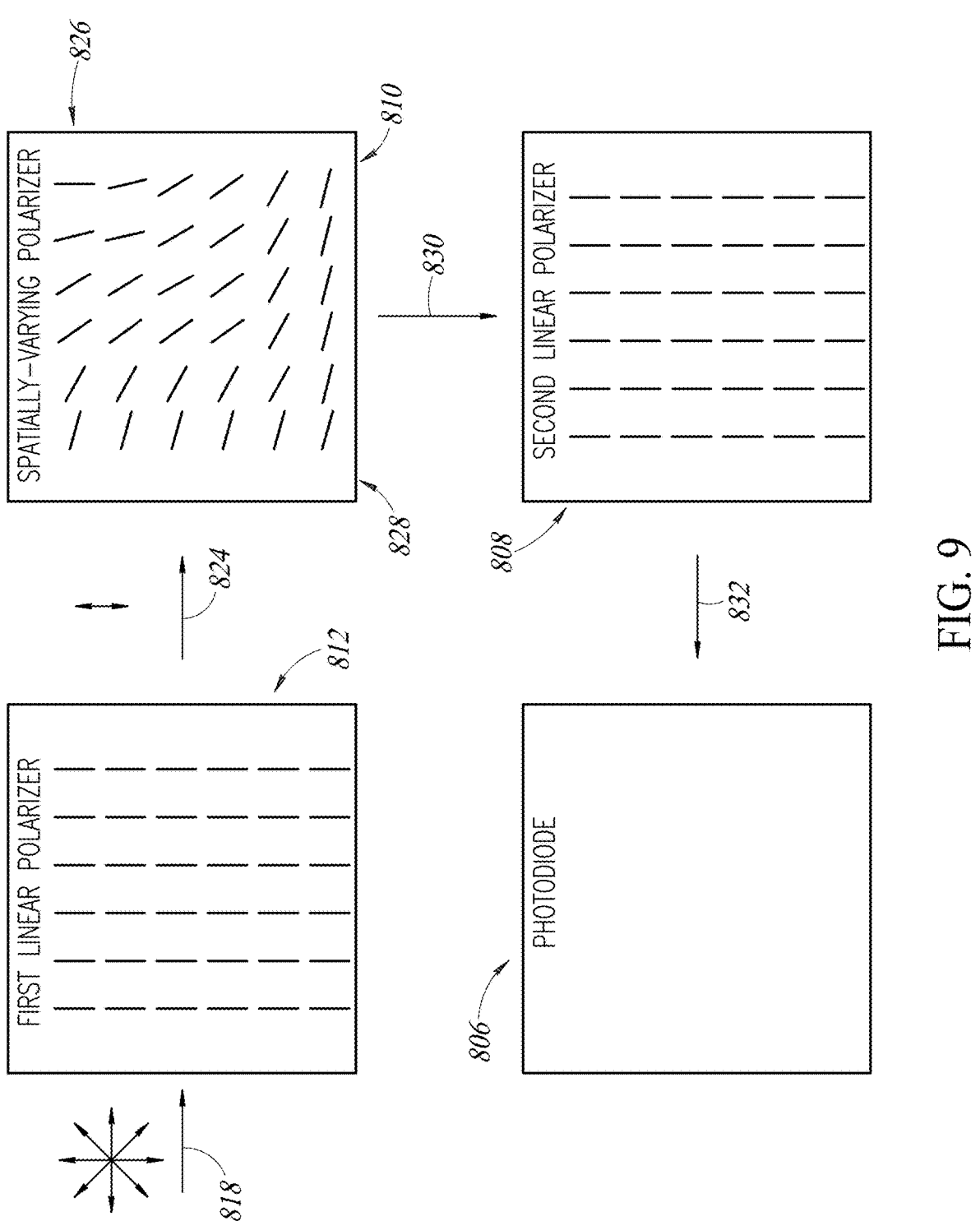
FIG. 9 shows a first linear polarizer, a spatially-varying polarizer and a second linear polarizer of an angle-sensitive photodiode structure and a polarization of light or a light spot passing therethrough to reach the photodiode.

FIG. 9 shows the first linear polarizer 812, spatially-varying polarizer 810 and second linear polarizer 808 of the angle-sensitive photodiode structure 804 and a polarization of the light 818 or light spot 822 passing therethrough to reach the photodiode 806. Initially the light 818 impinges on the first linear polarizer 812. The light 818 may have any polarization and may accordingly be said to be unpolarized in at least some implementations. In at least some implementations the light may be linearly polarized, circularly polarized or generally elliptically polarized.

The first linear polarizer 812 passes a linear polarization component 824 of the light 818 and rejects (absorbs or reflects) remaining polarization components of the light 818. Although the first linear polarizer 812 is shown as a vertical polarization filter, in various embodiments, the first linear polarizer 812 may be a horizontal polarization filter or a circular polarization filter, among others.

The linear polarization component 824 then impinges on the spatially-varying polarizer 810 positioned below the first linear polarizer 812. The spatially-varying polarizer 810 is tuned to have light polarization properties that vary according to a position on the spatially-varying polarizer 810, on which the linear polarization component 824 (or any impinging light) impinges on the spatially-varying polarizer 810. In the example shown in FIG. 9, the spatially-varying polarizer 810 changes the impinging linear polarization component 824.

The manner in which the spatially-varying polarizer 810 changes the impinging linear polarization component 824 varies according to a position where the impinging linear polarization component 824 impinges on the spatially-varying polarizer 810. The position may be substantially the same position that the light 818 impinges on angle-sensitive photodiode structure 804.

In this illustrative example, at a first end 826 (top right as shown) of the spatially-varying polarizer 810, the spatially-varying polarizer 810 retains the impinging linear polarization component 824 as a vertically polarized light signal.

The spatially-varying polarizer 810 passes vertically polarized light and blocks other polarization components. The linear polarization component 824 that impinges on the first end 826 passes through as is.

The polarization filtering properties of the spatially-varying polarizer 810 may gradually change as a function of a distance to the first end, as a non-limiting example. At a second end 828 (bottom left as shown) of the spatially-varying polarizer 810, the spatially-varying polarizer 810 nearly converts the impinging linear polarization component 824 that is vertically polarized into a horizontally polarized light signal. In particular, at the second end 828, the spatially-varying polarizer 810 has a linear polarization orientation of 175°. Accordingly, at the second end 828, the spatially-varying polarizer 810 outputs light having a greater horizontally polarized component than vertically polarized component. Conversely, near the center of the spatially-varying polarizer 810, the spatially-varying polarizer 810 has a linear polarization orientation of about 135° and, accordingly, the spatially-varying polarizer 810 rotates the polarization of the impinging linear polarization component 824 (having vertical polarization) towards the horizontal polarization by an angle of about 45°. Light exiting the spatially-varying polarizer 810 near its center has a vertical polarization component that has the same magnitude as its horizontal polarization component.

The spatially-varying properties of the spatially-varying polarizer 810 make it possible to identify a position or possible positions where the linear polarization component 824 impinged. The spatially-varying polarizer 810 passes filtered light 830 as illustrated in FIG. 9. An intensity of the filtered light 830 in either the horizontal or the vertical polarization is representative of a position or possible positions where the linear polarization component 824 impinged on the spatially-varying polarizer 810. The filtered light 830 has the highest vertical polarization magnitude when the linear polarization component 824 impinges on the first end 826. The vertical polarization magnitude may be inversely proportional to a distance from the first end 826.

The filtered light 830 then impinges on the second linear polarizer 808, which operates to remove any horizontal component of the filtered light 830 and pass vertical light components. The second linear polarizer 808 passes a filtered linear polarization component 832. The second linear polarizer 808 may ensure that light passed through to the photodiode 806 exclusively includes vertically polarized light and excludes horizontally polarized light.

The photodiode 806 receives the filtered linear polarization component 832 and detects an intensity of the filtered linear polarization component 832. The intensity of the filtered linear polarization component 832 is representative of the position or set of positions on which light 818 impinged on the spatially-varying polarizer 810 and, consequently, the angle-sensitive photodiode structure 804.

It is noted that the specific polarizations described with reference to FIG. 9 are made by way of example to facilitate description. In alternative embodiments, different polarizers, polarizations or polarization patterns may be employed. For example, in place of linear polarization, the first and second linear polarizers 812, 808 and the spatially-varying polarizer 810 may utilize circular polarization, elliptical polarization or any other type of polarization.

Referring back to FIG. 8, the size and position of the aperture 816 dictates the size of the light spot 822 formed on the angle-sensitive photodiode structure 804. The intensity detected by the photodiode 806 is representative of the intensity of the light spot 822 having passed through (or having been filtered by) the first and second linear polarizers 812, 808 and the spatially-varying polarizer 810. The intensity of the light spot 822 may be the sum of the intensities of the rays of light constituting the light spot 822. The fact that linear polarization components 824 of the light spot 822 impinge on an area of the spatially-varying polarizer 810 rather than one point lends additional degrees of freedom in the design of the spatially-varying polarizer 810 to enable improved position detection. The spatially-varying polarizer 810 may have properties that change by region to enable improved position detection of the light spot 822.

It is noted that in some embodiments, one of the first and second linear polarizers 812, 808 may be dispensed with. In an embodiment, the first linear polarizer 812 may be dispensed with and only horizontally polarized light may be emitted for position or angle determination.

In an embodiment, improved position detection may be achieved by using a photodiode 806 having multiple regional cells.

Figure 10:
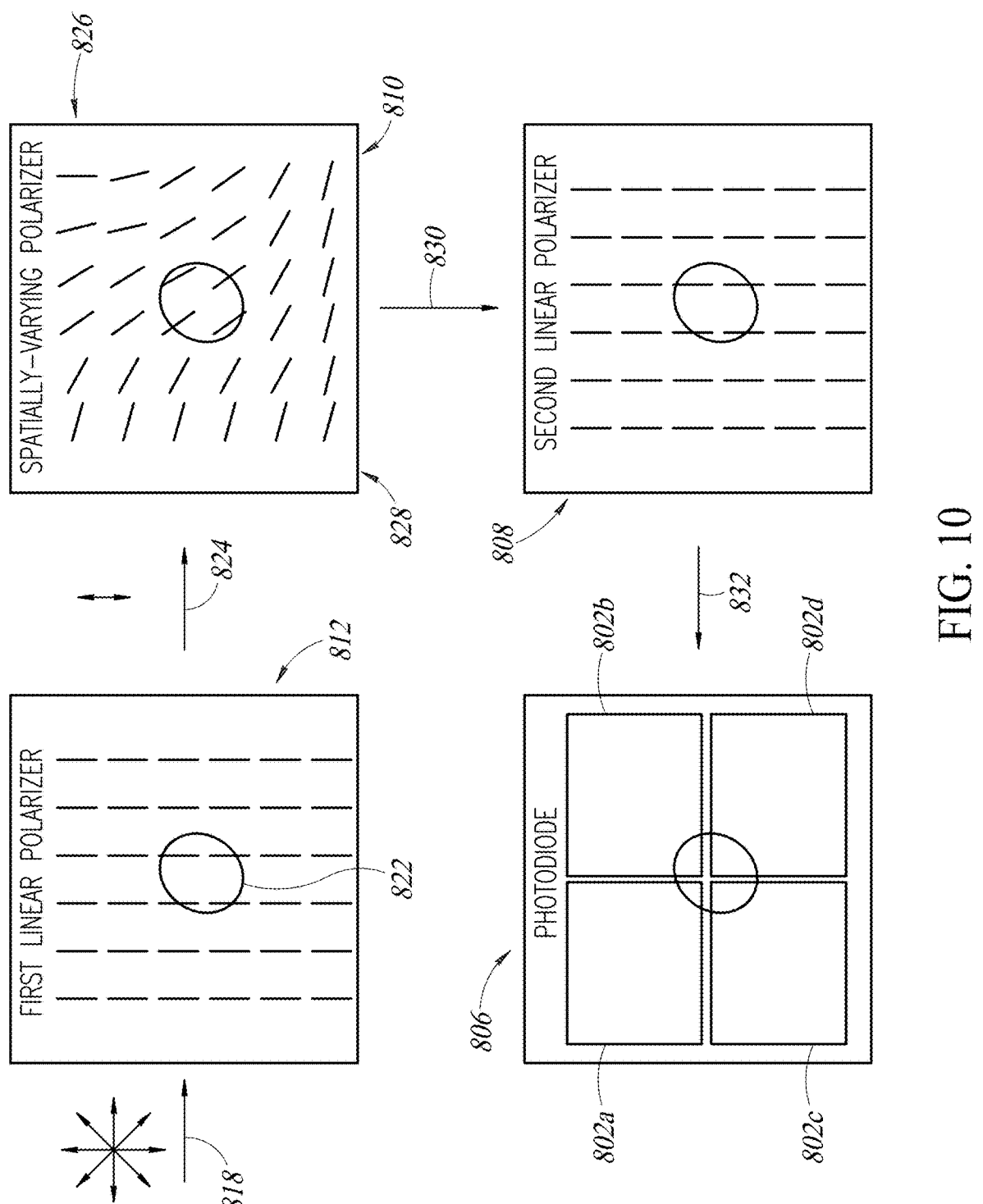
FIG. 10 shows the first linear polarizer, the spatially-varying polarizer and the second linear polarizer of the angle-sensitive photodiode structure and a polarization of the light or light spot passing therethrough to reach the photodiode.

FIG. 10 shows the first linear polarizer 812, spatially-varying polarizer 810 and second linear polarizer 808 of the angle-sensitive photodiode structure 804 and a polarization of the light 818 or light spot 822 passing therethrough to reach the photodiode 806. In FIG. 10, the photodiode 806 is a quadrant cell ("quad-cell") photodiode that includes four separate photodiode active areas or elements 802a-802d separated by a small gap. It should be appreciated that other types of angle sensitive detectors may also be used, such as photodiode detectors with fewer or more cells, position sensitive detectors (PSDs), etc.

The active area (e.g., anode) of each element 802a-802d is individually available so that a light spot illuminating a single quadrant can be electrically characterized as being in that quadrant only. The light spot's energy is distributed between adjacent elements 802a-802d, and the difference in electrical contribution to each element defines the relative position of the light spot with respect to the center of the angle sensitive detector. The relative intensity profile over the elements 802a-802d may be used to determine the position of the light spot in combination with the relative intensity profile of the spatially-varying polarizer 810.

In an embodiment, the spatially-varying polarizer 810 may be switched off to identify a baseline intensity.—The spatially-varying polarizer 810 may be coupled to a controller. The controller, which may be a microcontroller or a microprocessor, among others, or the one or more controllers 182 or the processor 502 described herein, may switch on or off the spatially-varying polarizer 810. When the spatially-varying polarizer 810 is switched on, the spatially-varying polarizer 810 filters light as described herein. Conversely, when the spatially-varying polarizer 810 is switched off, the spatially-varying polarizer 810 may cease polarization filtering and instead pass the linear polarization component 824 as is.

When the spatially-varying polarizer 810 is switched off, the photodiode 806 detects an intensity of the light 818 (or light spot 822) without the attenuation performed by the spatially-varying polarizer 810 in combination with the first and second linear polarizers 812, 808. The detected intensity may serve as a baseline intensity or maximum detected intensity. The baseline intensity or maximum detected intensity may correspond to the intensity of light 818 impinging on the first end 826.

When the spatially-varying polarizer 810 is switched on, the photodiode 806 detects an intensity of the light 818 (or light spot 822) with position dependent polarization filtering in place. The relationship between the detected intensity of the light 818 (or light spot 822) when position-dependent polarization filtering is in place with the baseline intensity is indicative of a position or a set of position where the light 818 impinged on the angle-sensitive photodiode structure 804.

As described herein, the polarization conversion performed by the spatially-varying polarizer 810 in combination with the filtering of the first and second linear polarizers 812, 808 results in spatially-varying amplitude (or intensity) attenuation of the light 818. The amplitude (or intensity) are, in turn, detected by the photodiode 806 and used for position determination.

Figure 11A:
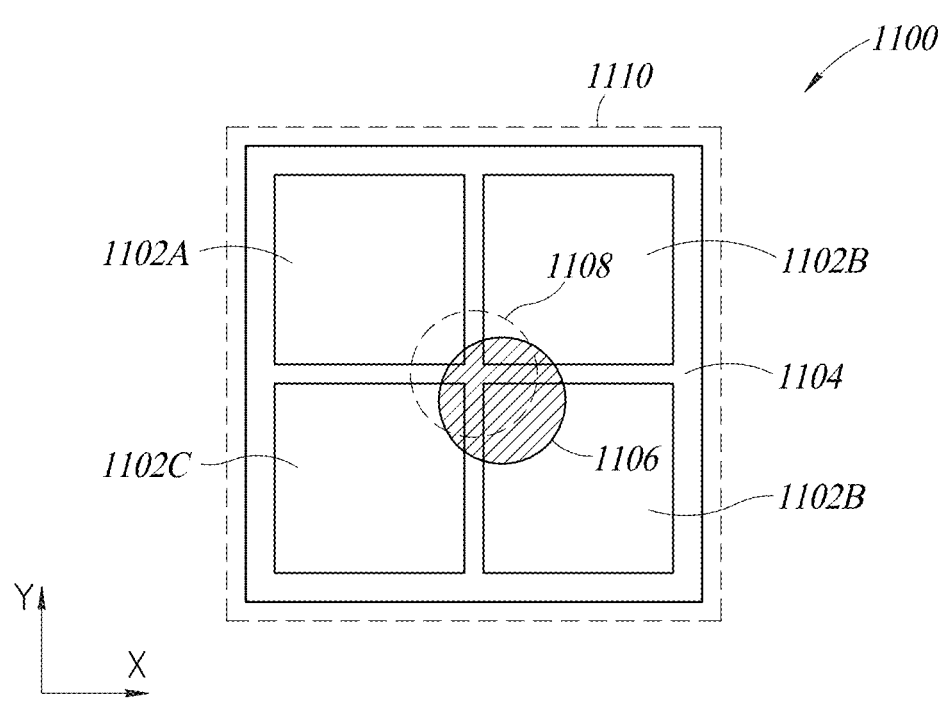
FIG. 11A is a top view of an example angle sensitive detector that may be used in one or more of the implementations of the present disclosure.
Figure 11B:
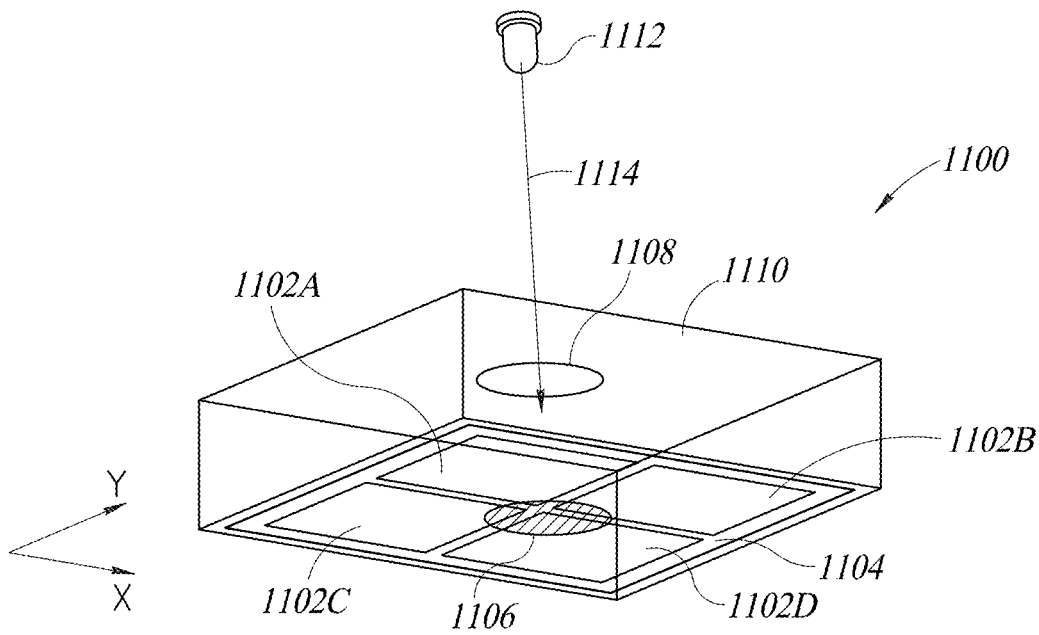
FIG. 11B is a perspective view of the angle sensitive detector shown in FIG. 11A.

FIGS. 11A and 11B show top and perspective views, respectively, of an example angle sensitive detector 1100 that may be used in one or more of the implementations of the present disclosure. In this example, the angle sensitive detector 1100 comprises a quadrant cell ("quad-cell") photodiode that includes four separate photodiode active areas or elements 1102A-1102D separated by a small gap on a common substrate 1104. It should be appreciated that other types of angle sensitive detectors may also be used, such as photodiode detectors with fewer or more cells, position sensitive detectors, etc.

In the non-limiting illustrated example, the active area (e.g., anode) of each element 1102A-1102D is individually available so that a light spot illuminating a single quadrant can be electrically characterized as being in that quadrant only. As the light spot is translated across the angle sensitive detector 1100, the light spot's energy is distributed between adjacent elements 1102A-1102D, and the difference in electrical contribution to each element defines the relative position of the light spot with respect to the center of the angle sensitive detector. The relative intensity profile over the elements 1102A-1102D may be used to determine the position of the light spot.

In this simplified example, the angle sensitive detector 1100 includes a cover 1110 that has an aperture 1108 therein that allows light 1114 from a light source 1112 to pass therethrough. As shown, the light 1114 that passes through the aperture 1108 forms a light spot 1106 can be electrically characterized to determine the angle of the light 1114, and therefore the angle of the light source 1112, relative to the angle sensitive detector 1100. As discussed below, the systems and methods of the present disclosure may utilize a plurality of light sources and angle sensitive detectors to determine the position of components of an HMD system.

It should be appreciated that the angle sensitive detectors of the present disclosure may include one or more of any suitable type of detectors, including quad-cell photodiode detectors, position-sensitive detectors (PSDs) that utilize resistive sheets, photodiode detectors with fewer (e.g., 2) or more (e.g., 16) independent sensitive elements, or any other detector able to detect the angle of arrival of light emitted from a light source. Further, as discussed below, in at least some implementations the angle sensitive detectors or light sources of the present disclosure may utilize various optical components, such as filters, lenses, polarizers, etc., to improve the functionality of the systems and methods discussed herein.

Figure 12:
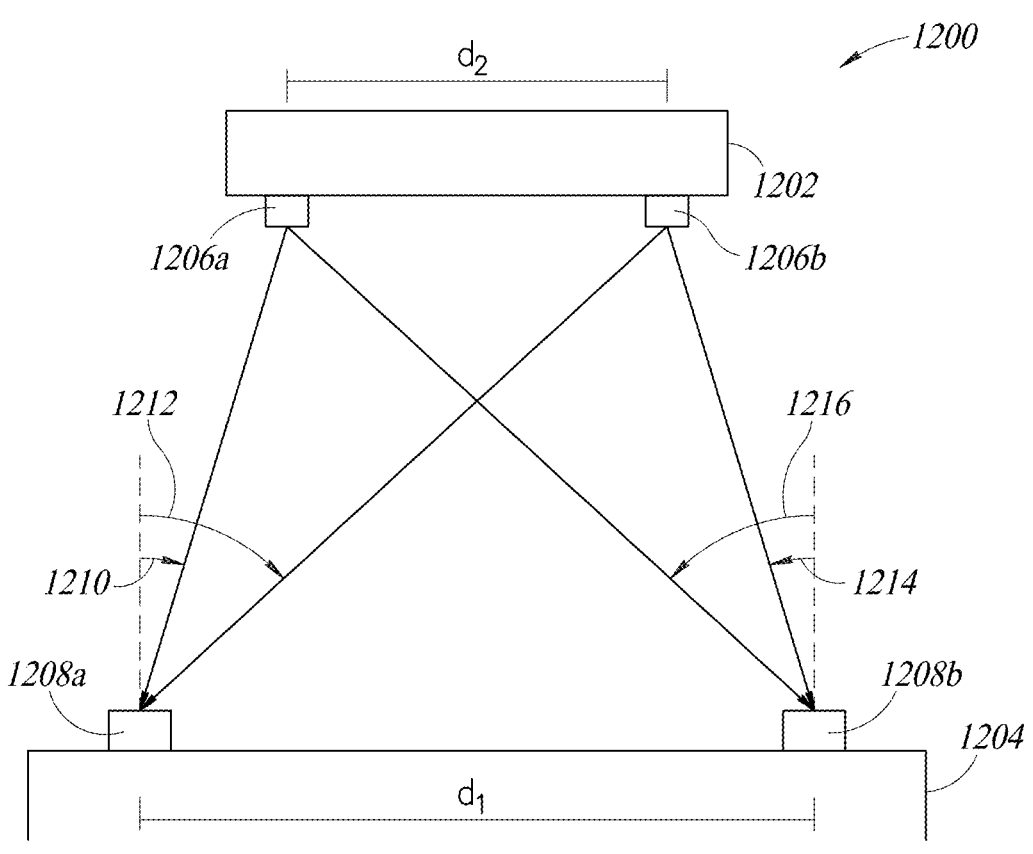
FIG. 12 is a simplified diagram illustrating use of light sources and angle sensitive detectors to determine the position of components of an HMD system, according to one non-limiting illustrated implementation.

FIG. 12 is a simplified diagram of an environment 1200 of an HMD system that uses light sources and angle sensitive detectors to determine the position of components of an HMD system, according to one non-limiting illustrated implementation. In this example, a first component 1202, such as a HMD, includes a plurality of light sources 1206 (two shown, 1206a and 1206b), and a second component 1204, such as a controller of an HMD system, includes a plurality of angle sensitive detectors 1208 (two shown, 1208a and 1208b). The angle sensitive detectors 1208a and 1208b are separated from each other on the second component 1204 by a known distance $d_1$, and the light sources 1206a and 1206b are separated from each other on the first component 1202 by a known distance $d_2$. The first and second components may be any components of an HMD system, such as an HMD, controller, base station, stationary or mobile light sources, stationary or mobile angle sensitive detectors, etc.

In this example, the angle sensitive detector 1208a is operative to determine that light arrives from the light source 1206a at an angle 1210, and light arrives from the light source 1206b at an angle 1212. Similarly, the angle sensitive detector 1208b is operative to determine that light arrives from the light source 1206b at an angle 1214, and light arrives from the light source 1206a at an angle 1216. Given the detected angles of arrival 1210, 1212, 1214, and 1216, and the known geometric relationships (e.g., distances $d_1$ and $d_2$) between the light sources 1206 and detectors 1208, methods (e.g., triangulation) may be used to determine and track the relative position, orientation, or movement between the first component 1202 and the second component 1204. As discussed above, one or more solvers or machine learning methods may be used to determine the position of components using sensor data from angle sensitive detectors and/or light source data indicating information regarding the light sources of the HMD system.

Figure 13:
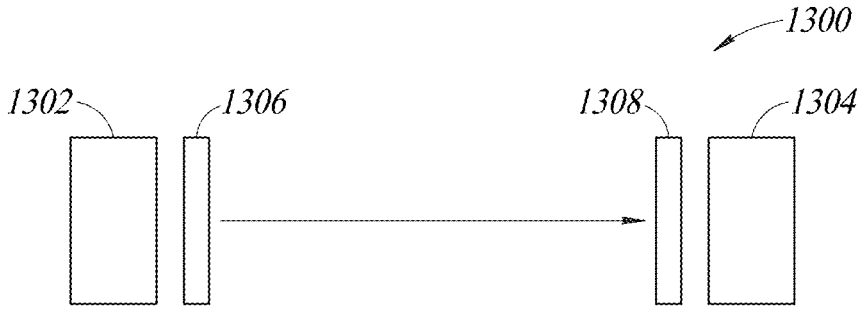
FIG. 13 is a diagram that depicts example optical systems of a light source and angle sensitive detector, according to one non-limiting illustrated implementation.

FIG. 13 is an illustration 1300 of an example light source 1302 and angle sensitive detector 1304 of the present disclosure. The light source 1302 and angle sensitive detector 1304 may be similar or identical to any of the light sources and angle sensitive detectors discussed herein, and may be used in any of the implementations of the present disclosure. In the illustrated example, the light source 1302 may include an optical subsystem 1306 and the angle sensitive detector 1304 may include an optical subsystem 1308. The optical subsystems 1306 and 1308 may be the same or different from each other, and may each include one or more optical components. The optical subsystems 1306 and 1308 may be integrated with the light source 1302 and angle sensitive detector 1304, or may be separate components. Non-limiting examples of optical components include one or more lenses, one or more polarizers, one or more filters, one or more apertures, etc. In at least some implementations, a subset of light sources may include one type of optical subsystem, and one or more other subsets of light sources may include another type of optical subsystem. Similarly, a subset of angle sensitive detectors may include one type of optical subsystem, and one or more other subsets of angle sensitive detectors may include another type of optical subsystem. As an example, the optical subsystems may comprise filters that filter out visible light or other types of light. Further as discussed above, the optical subsystems may include components that facilitate one or more of the various types of multiplexing discussed above that allow for multiple light sources to be illuminated simultaneously without confusion regarding the source of the emitted light.

Figure 14:
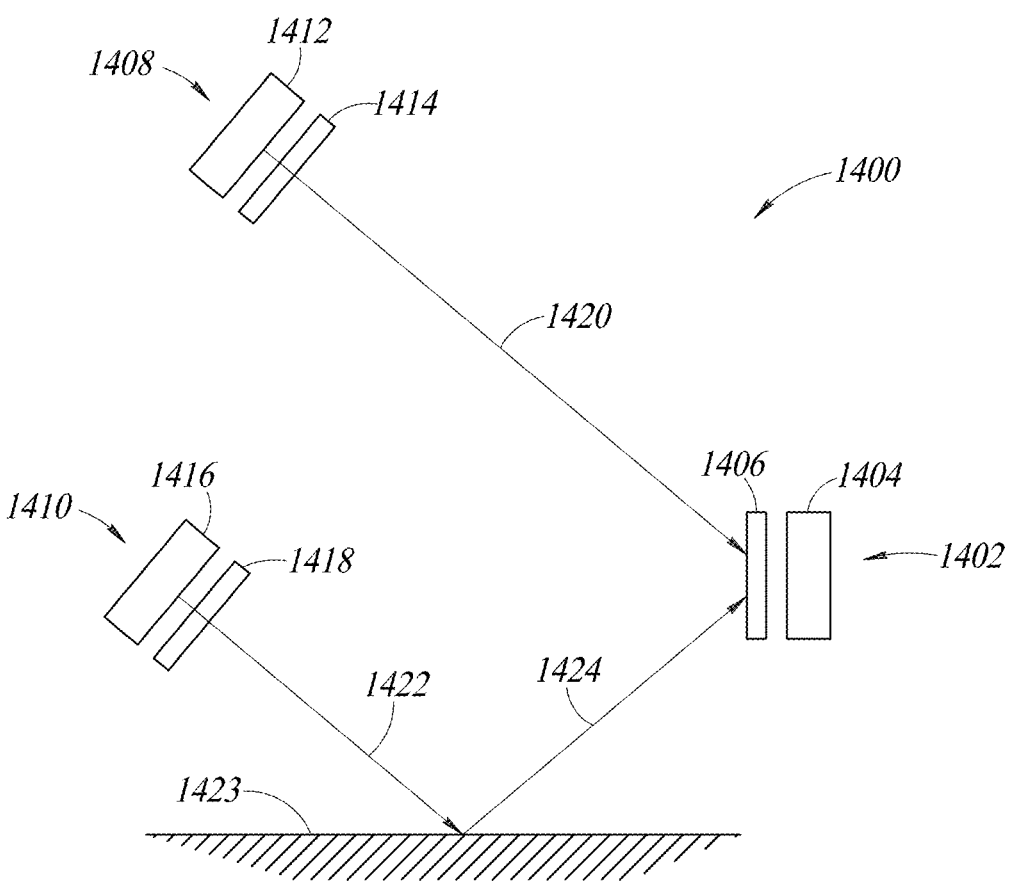
FIG. 14 is a diagram that depicts the operation of an example scatter detection module and light sources of a tracking system, according to one non-limiting illustrated implementation.

FIG. 14 is an illustration 1400 of a scatter detection module or scatter detector 1402 of the present disclosure, which may be used to determine whether light received by one or more optical detectors (e.g., angle sensitive or other types of detectors) has been reflected or scattered before being received by the one or more optical detectors. Using such information, the at least one processor may be operative to ignore light data determined to be scattered or reflected light signals, since such signals are not directly indicative of the position of the light source from which the signals were emitted. In at least some implementations, the scatter detector 1402 may be a separate component used in conjunction with one or more optical detectors used for position tracking. In other implementations, the scatter detector 1402 may be integrated into one or more optical detectors (e.g., angle sensitive detectors) used for position tracking. One or more scatter detectors 1402 may be used in any of the embodiments of the present disclosure. Further, various machine-learning or artificial intelligence-based methods may be used to process the scatter detector data improve the position tracking capabilities of the tracking systems of the present disclosure. For example, machine-learning or other AI methods may be used to train the tracking system to use polarization information to help improve tracking fidelity.

In the non-limiting illustrated example, the scatter detector 1402 is shown and first and second light sources 1408 and 1410 are also shown. In practice, there may be numerous scatter detectors and numerous light sources. As a non-limiting example, the scatter detector 1402 may be positioned on one of an HMD and a controller, and the light sources 1408 and 1410 may be positioned on the other of the HMD and the controller. In at least some implementations, one or more of the scatter detector 1402 and the light sources 1408 and 1410 may be positioned on or coupled to a fixed object (e.g., wall, ceiling, stand) or movable object (e.g., HMD, controller). The scatter detector 1402 and light sources 1408 and 1410 may be similar or identical to any of the light sources and scatter detectors discussed herein, and may be used in any of the implementations of the present disclosure.

In the illustrated example, the scatter detector 1402 may include an optical detector 1404, which may optionally be an angle sensitive detector, and an optical subsystem 1406. The light source 1408 may include a light emitter 1412 (e.g., LED) and an optical subsystem 1414 that emit light 1420, and the light source 1410 may include a light emitter 1416 and an optical subsystem 1414 that emit light 1422. Some or all of the optical subsystems 1406, 1414, and 1418 may be the same or different from each other, and may each include one or more optical components. The optical subsystems 1406, 1414, and 1418 may be integrated with the detector 1404 and light sources 1408 and 1410, respectively, or may be separate components. Non-limiting examples of optical components include one or more lenses, one or more polarizers, one or more wave retarders, one or more filters, one or more apertures, etc. In at least some implementations, a subset of light sources may include one type of optical subsystem, and one or more other subsets of light sources may include another type of optical subsystem. Similarly, a subset of scatter detectors 1402 may include one type of optical subsystem, and one or more other subsets of scatter detectors may include another type of optical subsystem. As an example, the optical subsystems may comprise filters that filter out visible light or other types of light. Further as discussed above, the optical subsystems may include components that facilitate one or more of the various types of multiplexing discussed above that allow for multiple light sources to be illuminated simultaneously without confusion regarding the source of the emitted light.

The design of the optical subsystems 1406, 1414, and 1418 may be coordinated such that the scatter detector 1402 is operative to detect whether light from the light sources 1408 and 1410 has been scattered or reflected, or whether the light reached the scatter detector directly without scattering or reflection. For example, the scatter detector 1402 may be operative to detect a change in the type or degree of polarization of light emitted by the light sources due to scattering or reflection. In the illustrated example, the light 1420 from the light source 1408 is received directly by the scatter detector 1402, while light 1422 from the light source 1410 is reflected off of a surface 1423 as light 1424 which is received by the scatter detector 1402. In this example, the light 1420 is indicative of the relative position of the light source 1408 with respect to the scatter detector 1402, whereas the light 1424 reflected from the surface 1423 is not indicative of the relative position of the light source 1410 with respect to the scatter detector 1402. Accordingly, by detecting that the light 1424 has been scattered or reflected, the tracking system may ignore or reject light signals from one or more sensors when performing position tracking, such as sensors that are positioned an oriented similar to the scatter detector, thereby improving the position tracking capabilities of the system.

There are a number of configurations that may allow the scatter detector 1402 to be able to detect whether light from a light source has been scattered or reflected, and therefore should be ignored by one or more detectors. Generally, in at least some implementations the light emitted by the light sources 1408 and 1410 may be polarized in a determined way by the optical systems 1414 and 1418, respectively, and the scatter detector 1402 may be configured to discriminate between light that is received directly from the light sources 1408 and 1410 and light from the light sources that is scattered or reflected before being received by the scatter detector. For example, the type or degree of polarization of light from the light sources may be altered as a result of scattering or specular reflection, and the scatter detector 1402 may be configured to detect such changes. As one non-limiting example, the optical subsystems 1414 and 1418 of the light sources 1408 and 1410, respectively, may comprise one of right-handed or left-handed circular polarizers, and the optical subsystem 1406 of the scatter detector 1402 may include the other of a right-handed or left-handed circular polarizer. For instance, the optical subsystems 1414 and 1418 of the light sources 1408 and 1410, respectively, may comprise right-handed circular polarizers, and the optical subsystem 1406 of the scatter detector 1402 may comprise a left-handed circular polarizer. In this configuration, the optical subsystem 1406 of the scatter detector 1402 may be used to detect light that has been reflected off of a depolarizing surface (e.g., has random polarization) or light that has been reflected off of a non-depolarizing surface (e.g., glass, metal, acrylic, etc.) and is left-circular polarized after the reflection. If such light is above a determined threshold, the tracking system may ignore signals from one or more detectors that are determined to have likely also received the reflected or scattered light.

Figure 15:
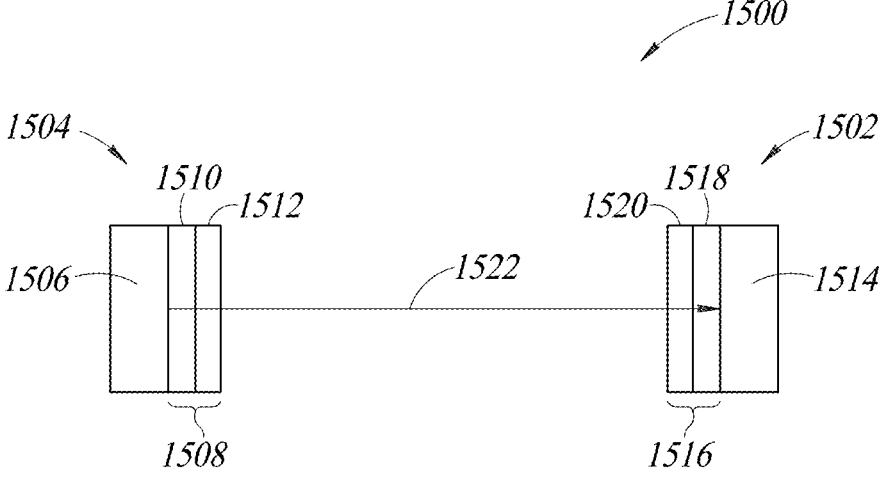
FIG. 15 is a diagram that depicts components of a light source and a scatter detection module of a tracking system, according to one non-limiting illustrated implementation.

An example of this configuration is shown in an illustration 1500 of FIG. 15, which shows a scatter detector 1502 and a light source 1504. The light source 1504 includes a light emitter 1506 (e.g., LED) and an optical subsystem that comprises a right-handed circular polarizer 1508. The circular polarizer 1508 in this implementation comprises linear polarizer 1510 and a quarter-wave retarder or wave plate 1512, and provides light 1522 having right-handed circular polarization.

The scatter detector 1502 includes an optical detector 1514 (e.g., quad-cell detector, single cell detector) and an optical subsystem that comprises a left-handed circular polarizer 1516. The left-handed circular polarizer 1516 comprises a quarter-wave retarder or wave plate 1518 and a linear polarizer 1520. Since the scatter detector 1502 includes a circular polarizer that is opposite handed from the circular polarizer 1508 of the light sources, the scatter detector will detect light that has been reflected via specular reflection due to the handedness of the reflected circularly polarized light switching to the opposite handedness (i.e., from right-handed to left-handed in this example).

In operation, when the scatter detector 1502 detects light that has been scattered or reflected (e.g., above a determined threshold), the tracking system may reject or ignore light from one or more optical sensors that may have likely received the same light (e.g., sensors that are positioned or oriented similar to the scatter detector).

Figure 16:
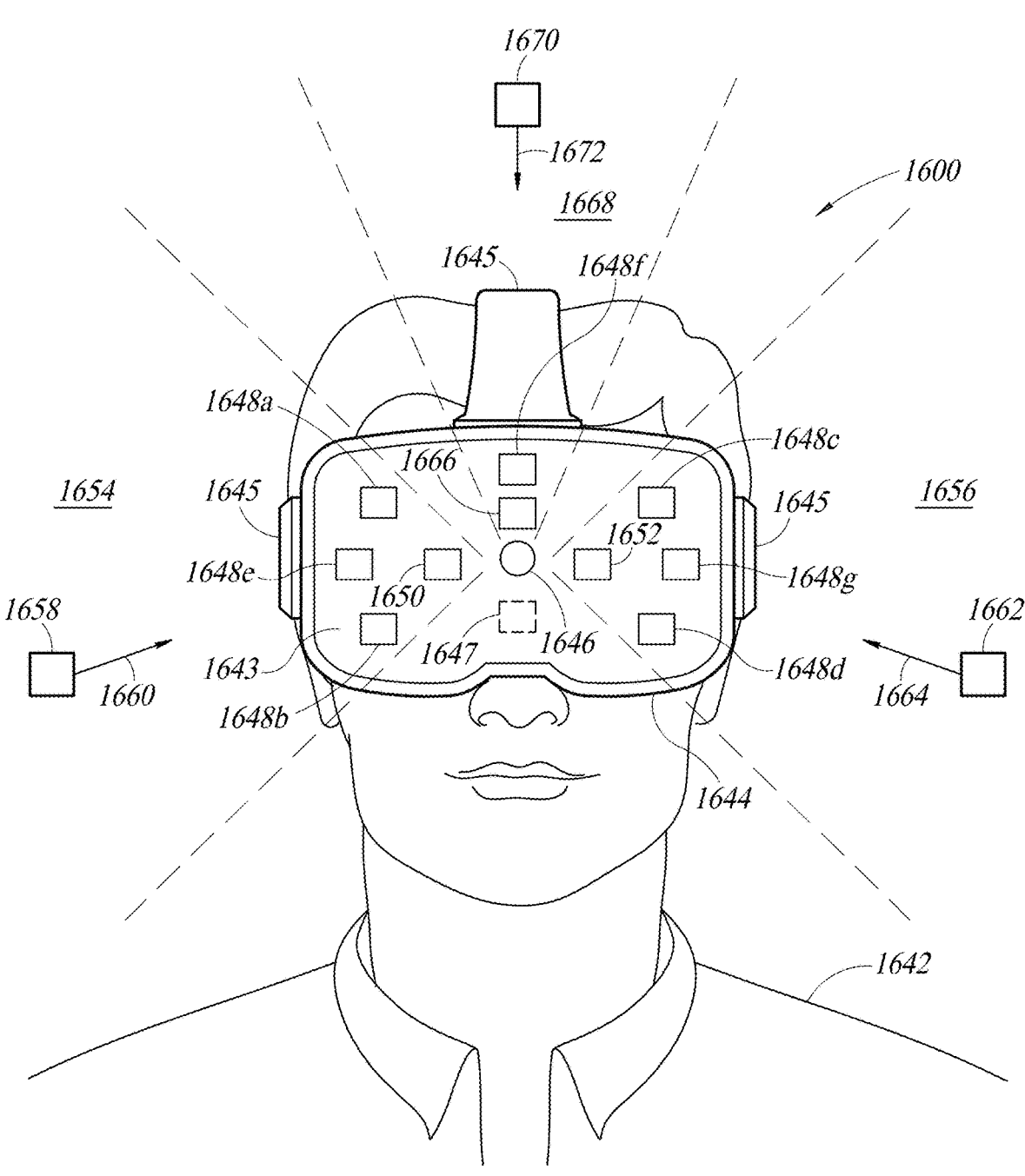
FIG. 16 is a pictorial diagram of an HMD device having binocular display subsystems, a plurality of angle sensitive detectors, and a plurality of scatter detection modules operative to detect light that has been scattered or reflected, which may be used to ignore such scattered light during a position tracking of the HMD device or a component thereof.

FIG. 16 shows information 1600 illustrating a front view of an example HMD device 1644 when worn on the head of a user 1642. The HMD device 1644 includes a front-facing structure 1643 that supports a front-facing or forward camera 1646 and a plurality of angle sensitive detectors 1648*a*-1648*f* (collectively 1648) of one or more types. As one example, some or all of the angle sensitive detectors 1648 may assist in determining the location and orientation of the device 1644 in space, such as light sensors to detect and use light information emitted from one or more external devices (not shown, e.g., base stations 214 of FIG. 2, controllers). The angle sensitive detectors 1648 may be any type of detector operative to detect the angle of arrival of light emitted from a light source. Non-limiting examples of angle sensitive detectors include photodiode detectors (e.g., bi-cell detectors, quadrant cell detectors), position sensitive detectors that use resistive sheets, etc.

As shown, the forward camera 1646 and the angle sensitive detectors 1648 are directed forward toward an actual scene or environment (not shown) in which the user 1642 operates the HMD device 1644. More generally, the angle sensitive detectors 1648 may be directed toward other areas (e.g., upward, downward, left, right, rearward) to detect light from various sources, such as controllers (e.g., held by the user 1642) or objects mounted at various locations (e.g., wall, ceiling). The actual physical environment may include, for example, one or more objects (e.g., walls, ceilings, furniture, stairs, cars, trees, tracking markers, light sources, or any other types of objects). The particular number of sensors 1648 may be fewer (e.g., 2, 4) or more (e.g., 10, 20, 30, 40) than the number of sensors depicted. The HMD device 1644 may further include one or more additional components that are not attached to the front-facing structure (e.g., are internal to the HMD device), such as an IMU (inertial measurement unit) 1647 electronic device that measures and reports the HMD device's 1644 specific force, angular rate, and/or the magnetic field surrounding the HMD device (e.g., using a combination of accelerometers and gyroscopes, and optionally, magnetometers). The HMD device 1644 may further include additional components that are not shown, including one or more display panels and optical lens systems that are oriented toward eyes (not shown) of the user and that optionally have one or more attached internal motors to change the alignment or other positioning of one or more of the optical lens systems and/or display panels within the HMD device.

The illustrated example of the HMD device 1644 is supported on the head of user 1642 based at least in part on one or more straps 1645 that are attached to the housing of the HMD device 1644 and that extend wholly or partially around the user's head. While not illustrated here, the HMD device 1644 may further have one or more external motors, such as attached to one or more of the straps 1645, and automated corrective actions may include using such motors to adjust such straps in order to modify the alignment or other positioning of the HMD device on the head of the user. It will be appreciated that HMD devices may include other support structures that are not illustrated here (e.g., a nose piece, chin strap, etc.), whether in addition to or instead of the illustrated straps, and that some embodiments may include motors attached one or more such other support structures to similarly adjust their shape and/or locations to modify the alignment or other positioning of the HMD device on the head of the user. Other display devices that are not affixed to the head of a user may similarly be attached to or part of one or structures that affect the positioning of the display device, and may include motors or other mechanical actuators in at least some embodiments to similarly modify their shape and/or locations to modify the alignment or other positioning of the display device relative to one or more pupils of one or more users of the display device.

The HMD device 1644 also includes a plurality of scatter detectors 1650, 1652 and 1666. The scatter detectors 1650, 1652 and 1666 may be similar or identical to any of the scatter detectors discussed herein, and may be operative detect whether light 1660, 1664, and 1672 from light sources 1658, 1662 and 1670, respectively, that are associated with the HMD device 1644 has been reflected or scattered off of a surface prior to reaching the HMD device. As discussed above, upon detection that light that has been scattered, sensor data from one or more sensors determined to have likely received the same light may be ignored.

In at least some implementations, a single scatter detector may be provided for all of the detectors 1648. In other implementations, a separate scatter detector may be provided for each of the detectors 1648, or a scatter detector may be included as part of one or more of the detectors 1648. In the illustrated simplified example, the scatter detector 1650 that is positioned on a right side of the front-facing structure 1643 corresponds to detectors 1648*a*, 1648*b*, and 1648*e*, which are used to detect light from light sources (e.g., light source 1658) in a region 1654 to the right side of the user 1642. That is, if the scatter detector 1650 detects light that has been reflected or scattered, the tracking system may ignore signals from one or more of the detectors 1648*a*, 1648*b*, and 1648*e* determined to have likely received the same light due to their similar orientation as the scatter detector 1650. Similarly, the scatter detector 1652 that is positioned on left right side of the front-facing structure 1643 corresponds to detectors 1648*c*, 1648*d*, and 1648*g*, which are used to detect light from light sources (e.g., light source 1662) in a region 1656 to the left side of the user 1642. The scatter detector 1666 on an upper region of the front-facing structure 1643 corresponds to detector 1648*f*, which is used to detect light from light sources (e.g., light source 1670) in a region 1668 that is above the user 1642. As discussed above, multiplexing (e.g., time, wavelength, pattern, code) may be used to allow the system to know which light source or group of light sources the light is received from by the detectors 1648, 1650, 1652 and 1666.

Figure 17:
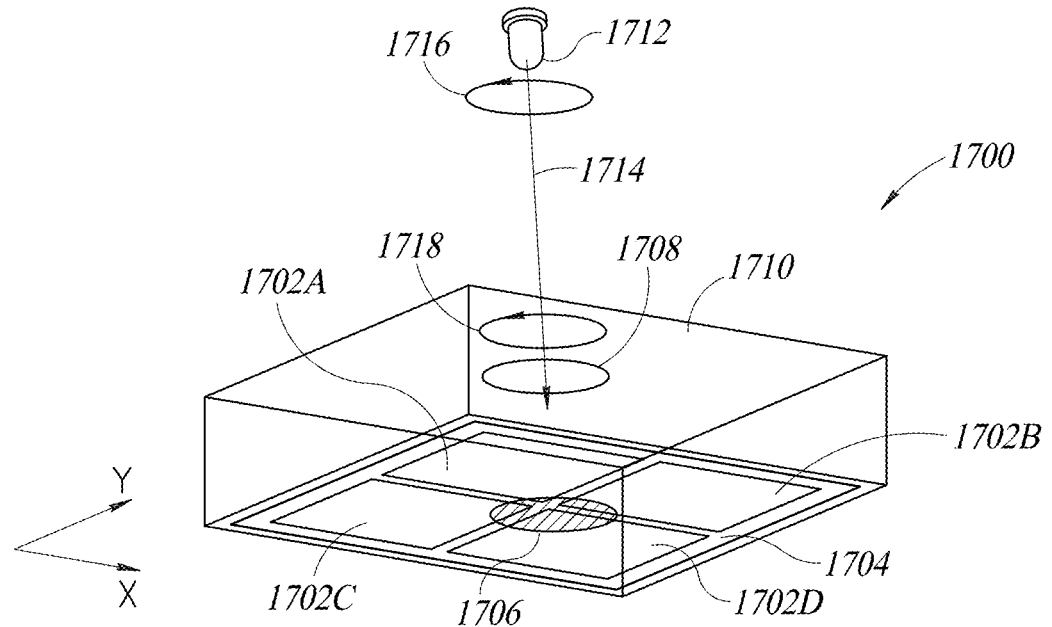
FIG. 17 is a perspective view of components of a light source and a scatter detection module of a tracking system, according to one non-limiting illustrated implementation.

FIG. 17 shows a perspective view of an angle sensitive detector or scatter detector 1700 that may be used in one or more of the implementations of the present disclosure. In this non-limiting example, the scatter detector 1700 comprises a quadrant cell ("quad-cell") photodiode that includes four separate photodiode active areas or elements 1702A-1702D separated by a small gap on a common substrate 1704. It should be appreciated that other types of detectors may also be used, such as photodiode detectors with fewer or more cells, position sensitive detectors, etc.

In the non-limiting illustrated example, the active area (e.g., anode) of each element 1702A-1702D is individually available so that a light spot illuminating a single quadrant can be electrically characterized as being in that quadrant only. As the light spot is translated across the detector 1700, the light spot's energy is distributed between adjacent elements 1702A-1702D, and the difference in electrical contribution to each element defines the relative position of the light spot with respect to the center of the detector. The relative intensity profile over the elements 1702A-1702D may be used to determine the position of the light spot.

In this simplified example, the detector 1700 includes an opaque cover or mask 1710 that has an aperture 1708 therein that allows light 1714 from a light source 1712 to pass therethrough. As shown, the light 1714 that passes through the aperture 1708 forms a light spot 1706 can be electrically characterized to determine the angle of the light 1714, and therefore the angle of the light source 1712, relative to the detector 1700. As discussed below, the systems and methods of the present disclosure may utilize a plurality of light sources and detectors to determine the position of components of an HMD system.

In the illustrated example, a first circular polarizer 1716 is positioned proximate (e.g., adjacent) the light source 1712, and a second polarizer 1718 is positioned proximate the detector 1700. In at least some implementations the light emitted by the light source 1712 may be polarized in a determined way by the first circular polarizer 1716 and the second circular polarizer 1718 of the scatter detector 1700 may be configured to discriminate between light that is received directly from the light source 1712 and light from the light source that is scattered or reflected before being received by the scatter detector 1700. As one non-limiting example, one of the first and second circular polarizers 1716 and 1718, respectively, may comprise one of right-handed or left-handed circular polarizers, and the other of the first and second circular polarizers 1716 and 1718 may include the other of a right-handed or left-handed circular polarizer. For instance, the first circular polarizer 1716 of the light source 1712 may comprise a right-handed circular polarizer, and the second circular polarizer 1718 of the scatter detector 1700 may comprise a left-handed circular polarizer. In this configuration, the second circular polarizer 1718 of the scatter detector 1700 may be used to detect light that has been reflected off of a depolarizing surface (e.g., has random polarization) or light that has been reflected off of a non-depolarizing surface (e.g., glass, metal, acrylic, etc.) and is left-circular polarized after the reflection. If such light is above a determined threshold, the tracking system may ignore signals from one or more detectors that are determined to have likely also received the reflected or scattered light.

Figure 18:
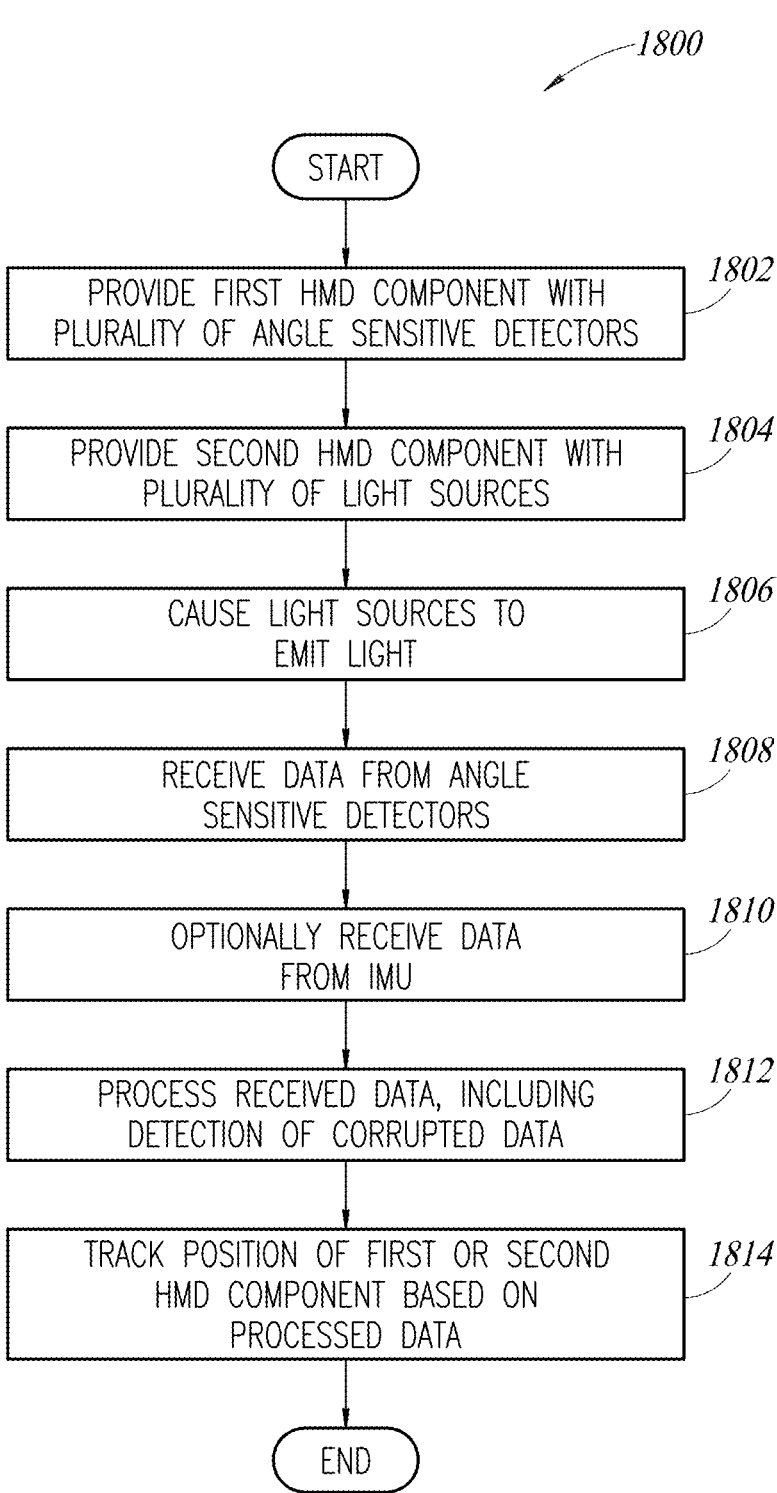
FIG. 18 is a flow diagram for a method of operating a position tracking system of an HMD system to track the position, orientation and/or movement of a component of the HMD system during use, according to an example embodiment of the present disclosure.

FIG. 18 is a flow diagram for an example method 1800 of operating an HMD system to track the position of an HMD component during use. The method 1800 may be performed by, for example, the position tracking system or module 512 of the HMD system 500 shown in FIG. 5. As discussed above, the method 1800 may be used to track the position of any component, such as HMD device wearable on the head of a user, one or more hand-held controllers, etc.

The illustrated implementation of the method 1800 begins at act 1802, wherein a first HMD system component having a plurality of angle sensitive detectors is provided. The plurality of angle sensitive detectors may be operative to detect light emitted from one or more light sources that may be fixedly positioned (e.g., mounted to a wall or ceiling) or movable (e.g., coupled to an HMD headset or controller). In operation, each of the plurality of angle sensitive detectors captures sensor data in a respective plurality of angle sensitive detector fields of view at a frame rate. The sensor data may comprise any type of data that is usable by control circuitry (e.g., a processor) to detect the presence and direction of a light source relative to the angle sensitive detector. In at least some implementations, each of the angle sensitive detectors may comprise one or more sensors (e.g., photodiodes) having image sensing circuitry and optionally image processing circuitry thereon. The angle sensitive detectors may output relatively raw data (e.g., light intensity or power data) or processed data (e.g., angle of incidence data).

At 1804, a second HMD system component may be provided that includes a plurality of light sources (e.g., near-IR LEDs). The second HMD system component may comprise a controller, an HMD headset, or a light source that is positioned in a fixed location (e.g., ceiling, wall), for example.

At 1806, at least one processor of the HMD system may cause the light sources to emit light. The light sources may be illuminated in a manner in which the angle sensitive detectors may each detect light from a single light source at a time or, more generally, in a manner in which the system may be able to determine from which light source that light detected by an angle sensitive detector was received. This may be achieved by multiplexing the illumination of the light sources using any suitable type of multiplexing, such as time multiplexing, wavelength multiplexing, frequency multiplexing, polarization multiplexing, or other techniques that allow the system to know the source of light received from each of the angle sensitive detectors during use.

As an example of time multiplexing, the at least one processor may illuminate only a subset (e.g., one, two, four) of the light sources at a time. For instance, the at least one processor may sequentially illuminate the light sources, one subset at a time, and collect sensor data responsive to each of the light sources.

As an example of wavelength multiplexing, different subsets of the light sources may emit different wavelengths of light, and different subsets of the angle sensitive detectors may operative to sense the different wavelengths of light. Thus, light sources having differing wavelengths may be illuminated simultaneously and detected by the corresponding wavelength-sensitive detectors.

As an example of frequency multiplexing, subsets of the light sources may be illuminated at determined patterns or frequencies that are detectable by the angle sensitive detectors to identify the particular source of the light of the light.

As an example of polarization multiplexing, subsets of the light sources may be polarized differently (e.g., linear, circular), and corresponding subsets of the angle sensitive detectors may be configured to detect certain polarized light (e.g., using polarizers that pass light having the corresponding polarization), which allows multiple light sources to be illuminated simultaneously.

Other non-limiting example techniques for illuminating the light sources may include frequency or wavelength division multiple access (FDMA or WDMA), time division multiple access (TDMA), code division multiple access (CDMA), orthogonal frequency division multiple access (OFDMA), etc.

At 1808, at least one processor associated with the HMD system may receive sensor data from the plurality of angle sensitive detectors. As noted above, for each angle sensitive detector, the sensor data may be indicative of the angle of arrival of light emitted from a known light source. At 1810, the at least one processor associated with the HMD system may optionally receive sensor data from an inertial measurement unit (IMU) that are operative to provide inertial tracking capabilities or sensor data from one or more additional sensors.

At 1812, the at least one processor associated with the HMD system may process the received sensor data, including the detection of corrupted data, as discussed further below. For example, the at least one processor may fuse some or all of the sensor data together to track one or more features present in an environment in which the HMD system is operated. The sensor data may include sensor data from the plurality of angle sensitive detectors, and optionally sensor data from an IMU, a camera, or other sensor data. The at least one processor may process the sensor data using a machine learning model (e.g., model 606) or another solver, for example. As discussed further below, in at least some implementations the at least one processor may ignore data from one or more sensors determined to be corrupted, for example, data from light that is not likely to have been received directly from a light source of the HMD system, but rather has been scattered, reflected, or received from another light source.

At 1814, the at least one processor associated with the HMD system may track the position (e.g., location, orientation, or movement) of the component of the HMD system in real-time during use of the HMD system by a user in the environment. The method 1800 may continue during operation of the HMD to continuously track the position of the component of the HMD system, as discussed above.

In processing the received sensor data, the control circuitry may identify one or more corrupted sensor data samples, wherein each of the one or more corrupted sensor data samples includes a sensor data sample from one of the plurality of angle sensitive detectors identified as likely not representing light that has been directly received by the one of the plurality of angle sensitive detectors from the one or more light sources. In at least some implementations, the control circuitry is configured to ignore the corrupted sensor data samples during the tracking process, and may continue to ignore samples from that optical detector for a fixed or variable period of time.

The identification of the corrupted sensor data samples may be based at least in part on a known geometry of at least one of the first and second head-mounted display system components. For example, at least one projection model of the first head-mounted display system component or the second head-mounted display system component may be utilized to determine which of the plurality of angle sensitive detectors are likely to have not directly received light from the one or more of the plurality of light sources, and data from such detectors may be ignored for a period of time. For example, received sensor data samples may be compared to the at least one projection model, and the received sensor data samples that do not match the at least one projection model within a defined threshold may be identified as corrupted sensor data samples that should be ignored.

Additionally or alternatively, identification of the one or more corrupted sensor data samples may be based at least in part on one or more of a past position or orientation of at least one of the first and second head-mounted display system components, a present position or orientation of at least one of the first and second head-mounted display system components, or a predicted future position or orientation of at least one of the first and second head-mounted display system components.

In at least some implementations, the number of samples or the period of time that one or more detectors are disabled may be selectively varied based on various criteria, such as actual or predicted movement (e.g., direction, speed, rotation) of at least one of the first head-mounted display system component or the second head-mounted display system component. As an example, comparison with a projection model may indicate that the detector is obstructed by an object (e.g., wall, person, other component) or is facing away from the light sources of an HMD system, and is therefore unlikely to receive light directly from one of the light sources of the HMD system for a period of time. The control circuitry may track the position or movement of one or more components to determine a time period after which the detector is expected to once again receive light from at least one of the plurality of light sources, at which time the system may again use samples from the detector for tracking purposes.

The head-mounted display system components may include a head-mounted display device wearable on a head of a user, a controller, a base station, or other HMD system component. As discussed elsewhere herein, to process the received sensor data, the control circuitry may provide the received sensor data as input to one or more trained machine learning models.

Figures 19, 20:
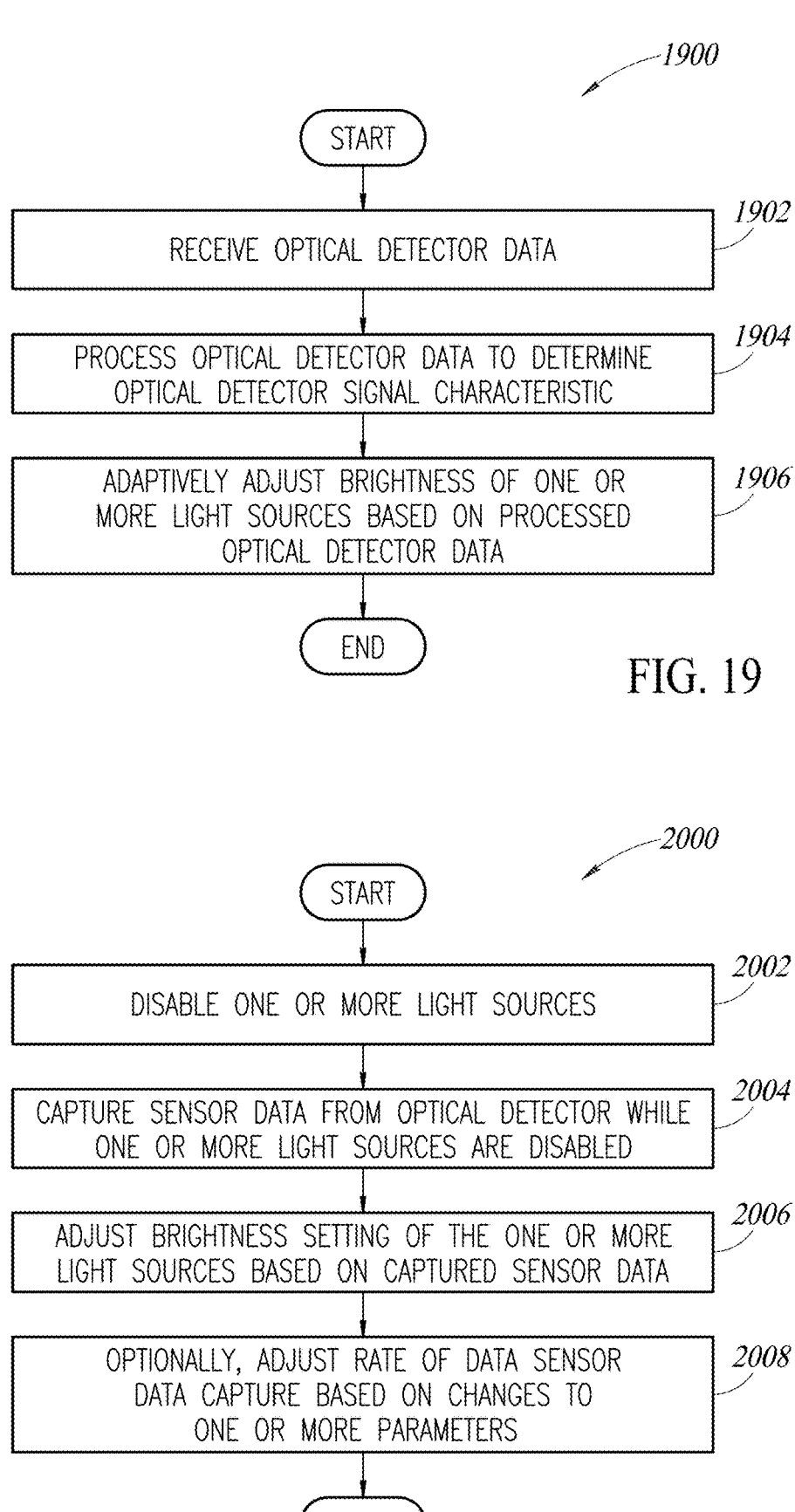
FIG. 19 is a flow diagram for a method of adaptively adjusting the brightness of a plurality of light sources or optical detectors of a position tracking system of an HMD system, according to an example embodiment of the present disclosure.
FIG. 20 is a flow diagram for a method of adaptively adjusting the brightness of a plurality of light sources or optical detectors of a position tracking system of an HMD system based on changes to one or more parameters, according to an example embodiment of the present disclosure.

FIG. 19 is a flow diagram for a method of adaptively adjusting the brightness of a plurality of light sources of a position tracking system of an HMD system, according to an example embodiment of the present disclosure. The method 1900 may be performed by, for example, the position tracking system or module 512 of the HMD system 500 shown in FIG. 5. As discussed above, the method 1900 may be implemented during the tracking of the position of any component, such as HMD device wearable on the head of a user, one or more hand-held controllers, etc., for example, in conjunction with the method 1800 of FIG. 18. Advantageously, the adaptive brightness features discussed herein may provide improved performance by utilizing relatively more of the dynamic range of the detectors, and may also increase battery life by reducing power consumption.

The method 1900 begins at 1902, wherein control circuitry of an HMD system receives optical detector data from an optical detector (e.g., photodiode, angle sensitive detector). At 1904, the control circuitry may process the received optical detector data, and at 1906 the control circuitry may adaptively adjust the brightness of at least one of a plurality of light sources based at least in part on the processed optical detector data. In at least some implementations, the control circuitry adaptively adjusts the brightness of the at least one of the one or more light sources based on a dynamic range of the optical detector, for example to maximize the dynamic range of the optical detector. To adjust the brightness, the pulse width of a signal supplied to the one or more light sources may be selectively adjusted.

In at least some implementations, the control circuitry may disable the one or more light sources ("dark measurement"), and receive the optical data from the optical detector while the one or more light sources are disabled. Such feature may allow the brightness of the one or more light sensors to be adapted based on an ambient light level in the environment in which the HMD system is operated.

An example method 2000 of this feature is shown in FIG. 20. At 2002, the control circuitry may disable one or more (e.g., all) light sources of an HMD system. At 2004, the control circuitry may capture sensor data from the optical detector while the one or more light sources are disabled. At 2006, the control circuitry may adjust a brightness setting of the one or more light sources based on the captured sensor data. At 2008, the control circuitry may optionally adjust a rate of sensor data capture for brightness adjustment based on changes to one or more parameters, such as movement of one or more component, elapsed time, number of samples, amount of ambient light, detected changes in ambient light, etc. To adaptively adjust the brightness of one or more light sources, the received optical detector data may be provided as input to one or more trained machine learning models, as discussed elsewhere herein. In at least some implementations, the control circuitry may perform light measurements periodically (e.g., every 5 samples, every 50 samples), and adjust the brightness of the light source after each of the measurements based on the results of the measurements.

FIG. 21 is a flow diagram for a method of compensating for non-uniform brightness of light sources of a position tracking system of an HMD system, according to an example embodiment of the present disclosure. In practice, an angle sensitive detector, such as a quad photodiode (QPD), may include a number of channels that are read sequentially in time (e.g., via multiplexing). Thus, since the measurements of all of the channels of a detector are not captured simultaneously, any non-uniformity in the brightness of light sources may cause inaccurate measurements. For example, as an LED is illuminated for an illumination period, its intensity may vary over the illumination period due to thermal and other effects (e.g., "droop"). As discussed below, the method 2100 compensates for this effect, which advantageously provides more accurate measurements used for position tracking.

The method 2100 may be performed by, for example, the position tracking system or module 512 of the HMD system 500 shown in FIG. 5. As discussed above, the method 2100 may be implemented during the tracking of the position of any component, such as HMD device wearable on the head of a user, one or more hand-held controllers, etc., for example, in conjunction with the method 1800 of FIG. 18.

The method 2100 begins at 2102, wherein control circuitry may cause one or more light sources to emit light during an illumination period. At 2104, the control circuitry may receive sensor data from an angle sensitive detector, which includes sequentially capturing sensor cell samples from the plurality of sensor cells during the illumination period, as discussed above. For example, the control circuitry may include an analog-to-digital converter (ADC), and a multiplexer may be used to sequentially read in sensor cell samples from each of a plurality (e.g., four) sensor cells of the angle sensitive detector. The illumination data may be captured using other methods that are able to provide an illumination profile for the light source with respect to time.

At 2106, the control circuitry may process the received sensor data, including determining a correction to account for non-uniform brightness of the one or more light sources during the sequential capturing of the sensor cell samples. At 2108, the control circuitry may use the determined correction to apply calibration data to the sensor cell samples, and track a position of the first head-mounted display system component using the calibrated sensor cell samples. The calibration data may represent a characteristic slope of the brightness of the one or more light sources during the illumination period, for example.

In at least some implementations, the control circuitry may iteratively determine updated calibration data, and may track the position of the first head-mounted display system component using the updated calibration data. As an example, to determine the updated calibration data, the control circuitry may disable the one or more light sources for a calibration period, sequentially capture sensor cell samples from the plurality of sensor cells during the calibration period, interpolate the captured sensor cell samples, and determine the updated calibration data based on the interpolation of the captured sensor cell samples.

The calibration data may additionally or alternatively be determined during a manufacturing or design process of the HMD system. For example, a characteristic slope or function of a light source (e.g., LED) may be determined empirically using angle sensitive detectors or other types of optical detectors, and such information may be provided to an HMD system to compensate for the non-uniformity of the light source (or a similar or identical light source) during operation of the HMD system. More generally, a method of calibrating a head-mounted display system component may include causing one or more light sources to emit light for an illumination period, sequentially capturing sensor cell samples from a plurality of sensor cells of an angle sensitive detector, processing the received sensor cell samples to generate calibration data that accounts for non-uniform brightness of the one or more light sources during the illumination period, and storing the calibration data in a nontransitory processor-readable storage medium for subsequent use in tracking at least one component of a head-mounted display system.

FIG. 22 is a flow diagram for a method of adaptively enabling and disabling components of a tracking subsystem of an HMD system, according to an example embodiment of the present disclosure. In the context of light sources (e.g., LEDs), the implementation of the method 2200 may be referred to as "adaptive firing" of the LEDs, which may reduce power consumption and therefore extend battery life, for example. As discussed above, the method 2200 may be implemented during the tracking of the position of any component, such as HMD device wearable on the head of a user, one or more hand-held controllers, etc., for example, in conjunction with the method 1800 of FIG. 18.

The method 2200 begins at 2202, wherein control circuitry causes one or more of the plurality of light sources to emit light. At 2204, the control circuitry receives sensor data from one or more of the plurality of optical detectors, and tracks a position of a first head-mounted display system component based at least in part on the received sensor data, as discussed elsewhere herein.

At 2206, the control circuitry may process the received sensor data, including to determine whether to disable any one of the optical detectors or the light sources based on determined disabling criteria. At 2208, the control circuitry may disable each of the optical detectors or the light sources that satisfy the disabling criteria for a respective disabled time period during the tracking of the position of the first head-mounted display system component.

Generally, the disabling criteria provides or facilitates a determination that light emitted by the light source is not likely to be received by any of the optical detectors of the first head-mounted display system component. For example, the disabling criteria may determine that a particular light source is facing away from optical detectors of the HMD system, or is obstructed by an object (e.g., person, component, furniture, wall) in the environment in which the HMD system is operated. Similarly, the control circuitry may determine that an optical detector is not likely to received light from a light source, and therefore can be disabled for a fixed or variable period of time.

The disabling criteria may be based at least in part on a determined relative position or movement between the first head-mounted display system component and a second head-mounted display system component, such as the relative position or movement between a controller and a headset, the relative position or movement between a controller and a base station, or the relative position or movement between a headset and a base station. As discussed above, one or more projection models may be used to assess whether light from a light source is predicted to be directly received by the optical sensors of the HMD system. In at least some implementations, position tracking information may be used to predict when particular components (e.g., light sources, detectors) can be disabled, and when such components should be re-enabled.

In at least some implementations, the disabling criteria provides or facilitates a determination that light emitted by each light source in a first subset of the plurality light sources is likely to be received by at least one of the optical detectors of the first head-mounted display system component, and the disabling criteria is operative to disable a second subset of light sources within the first subset of light sources for respective disabled time periods. For example, the system may determine that a first subset of four spaced apart light sources are likely to be detected by one or more detectors, and may disable two light sources (i.e., a second subset) of the first subset so that only two light sources are enabled for a period of time. This feature may increase battery life while still providing light sources that are detectable by the optical sensors. In at least some implementations, the light sources in the first subset of light sources that are not disabled may be light sources that are relatively spaced apart from each other, which provides relatively larger angles of separation with respect to the optical detectors that detect the light emitted by the light sources, which may improve measurement accuracy.

Figure 23:
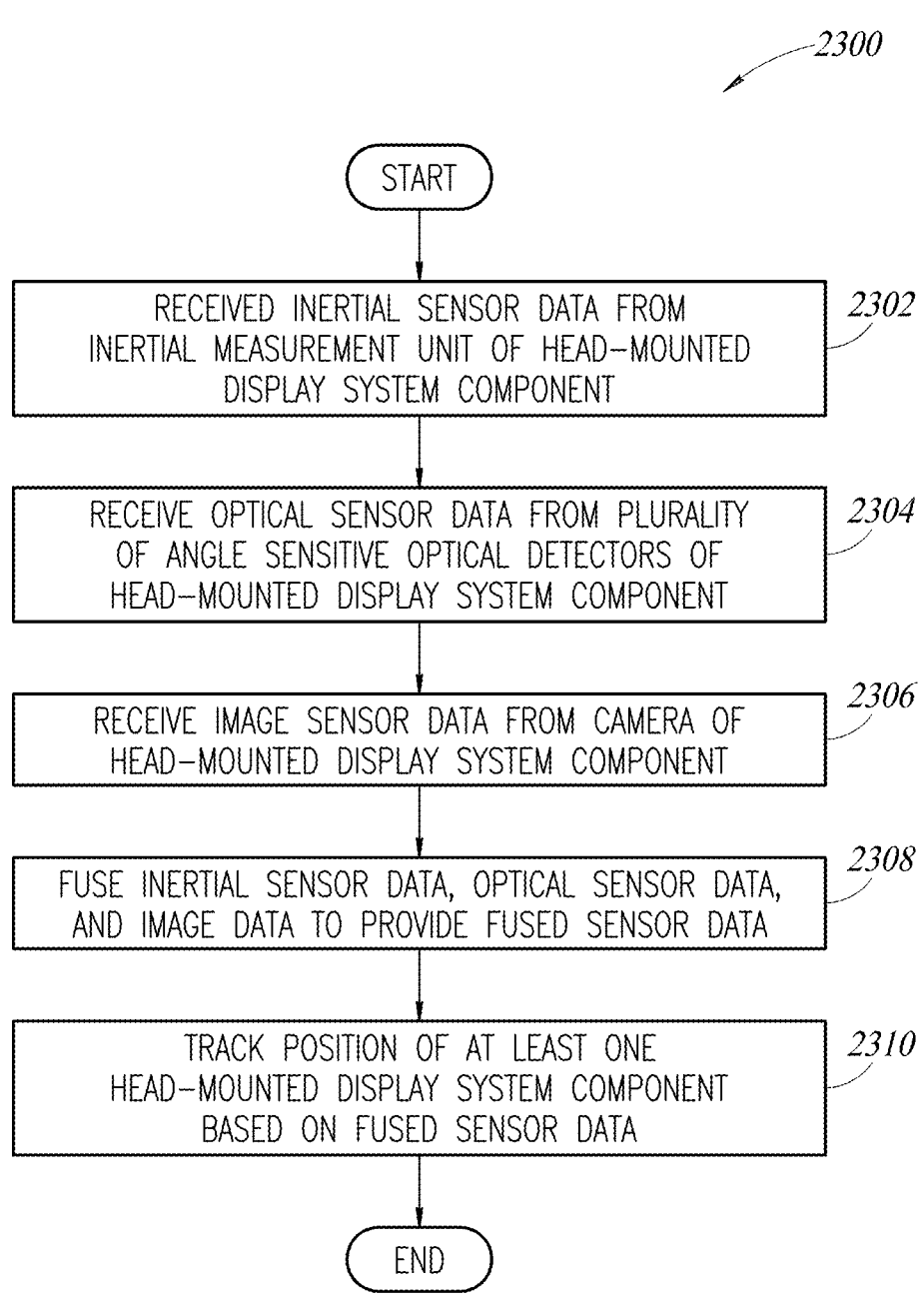
FIG. 23 is a flow diagram for a method of operating a position tracking system of an HMD system to track the position, orientation and/or movement of a component of the HMD system by fusing inertial sensor data, optical sensor data, and image data, according to an example embodiment of the present disclosure.

FIG. 23 is a flow diagram for a method of operating a position tracking system of an HMD system to track the position, orientation and/or movement of a component of the HMD system during use, by fusing inertial sensor data, optical sensor data, and image data, according to an example embodiment of the present disclosure. As discussed above, the method 2300 may be implemented during the tracking of the position of any component, such as HMD device wearable on the head of a user, one or more hand-held controllers, etc., for example, in conjunction with the method 1800 of FIG. 18.

The head-mounted display system may include a first head-mounted display system component, an inertial measurement unit (IMU) carried by the first head-mounted display system component, a plurality of angle sensitive optical detectors (or other types of optical detectors) carried by the first head-mounted display system component, and at least one camera carried by the first head-mounted display system component. At 2302, control circuitry associated with the HMD system may receive inertial sensor data from the inertial measurement unit. At 2304, the control circuitry may receive optical sensor data from one or more of the plurality of angle sensitive optical detectors or other types of optical detectors. At 2306, the control circuitry may receive image sensor data from the camera. As an example, the camera may be a forward facing camera of an HMD device wearable on the head of the user.

At 2308, the control circuitry may process or fuse the received inertial sensor data, optical sensor data and image sensor data. For example, the control circuitry may utilize one or more sensor fusion algorithms including, but not limited to central limit theorem algorithm, Kalman filters, Bayesian networks, Dempster-Shafer algorithm, or a convolutional neural network. At 2310, the control circuitry may track a position of the first head-mounted display system component based at least in part on the processing of the received inertial sensor data, optical sensor data and image sensor data. In at least some implementations, to process the received inertial sensor data, optical sensor data and image sensor data, the control circuitry may provide the inertial sensor data, optical sensor data and image sensor data as input to one or more trained machine learning models, as discussed elsewhere herein (see, e.g., FIG. 6).

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. Provisional App. No. 63/249,348 filed on Sep. 28, 2021, and U.S. Nonprovisional application Ser. No. 17/954,076 filed on Sep. 27, 2022, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A head-mounted display system, comprising:
a first head-mounted display system component wearable by a user;
an angle sensitive detector carried by the first head-mounted display system component, in operation, the angle sensitive detector captures sensor data indicative of an angle of arrival of light, wherein the angle sensitive detector comprises a plurality of sensor cells, in operation, each sensor cell outputs sensor cell samples that represent an intensity of light incident on the sensor cell;
a second head-mounted display system component that includes one or more light sources; and
control circuitry operative to:
cause a light source of the one or more light sources to emit light during an illumination period;
receive sensor data from the angle sensitive detector, including sequentially capturing sensor cell samples from the plurality of sensor cells during the illumination period;
process the received sensor data, including applying calibration data to the sensor cell samples to account for non-uniform brightness of the light source of the one or more light sources during the sequential capturing of the sensor cell samples; and
track a position of the first or second head-mounted display system components based at least in part on the processing of the received sensor data.

2. The head-mounted display system of claim 1 wherein the calibration data represents a characteristic slope of the brightness of the light source of the one or more light sources during the illumination period.

3. The head-mounted display system of claim 1 wherein, in operation, the control circuitry iteratively determines updated calibration data, and tracks the position of the first or second head-mounted display system components using the updated calibration data.

4. The head-mounted display system of claim 3 wherein, to determine the updated calibration data, the control circuitry:
disables the light source of the one or more light sources for a calibration period;
sequentially captures sensor cell samples from the plurality of sensor cells during the calibration period;
interpolates the captured sensor cell samples; and
determines the updated calibration data based on the interpolation of the captured sensor cell samples.

5. The head-mounted display system of claim 1, further comprising an analog-to-digital converter configured to convert the sensor cell samples into digital data for subsequent processing by the control circuitry.

6. The head-mounted display system of claim 1, wherein the plurality of sensor cells are sequentially read by a multiplexer arranged to sample the sensor cells in a predetermined order during the illumination period.

7. The head-mounted display system of claim 1, wherein the control circuitry is further configured to determine a correction factor based on a rate of change in brightness of the light source of the one or more light sources during the illumination period, thereby compensating for thermal droop effects.

8. The head-mounted display system of claim 1, wherein the control circuitry iteratively updates the calibration data by temporarily disabling the light source of the one or more light sources during a calibration period, capturing baseline sensor cell samples, and recalculating the calibration data based on an interpolation of the captured samples.

9. A method of calibrating a head-mounted display system component, the head-mounted display system component comprising an angle sensitive detector that, in operation, captures sensor data indicative of an angle of arrival of light emitted from one or more light sources, wherein the angle sensitive detector comprises a plurality of sensor cells, in operation, each sensor cell outputs sensor cell samples that represent an intensity of light incident on the sensor cell, the method comprising:
causing a light source of the one or more light sources to emit light for an illumination period;
receiving sensor data from the angle sensitive detector during the illumination period, including sequentially capturing sensor cell samples from the plurality of sensor cells;
processing the received sensor cell samples to generate calibration data that accounts for non-uniform brightness of the light source of the one or more light sources during the illumination period; and
storing the calibration data in a nontransitory processor-readable storage medium for subsequent use in tracking at least one component of a head-mounted display system.

10. The method of claim 9 wherein the calibration data represents a characteristic slope of the brightness of the light source of the one or more light sources during the illumination period.

11. The method of claim 9 wherein processing the received sensor cell samples comprises:
interpolating the captured sensor cell samples; and
determining the calibration data based on the interpolation of the captured sensor cell samples.

12. The method of claim 9, further comprising sequentially capturing the sensor cell samples using a multiplexer and converting the captured sensor cell samples to digital signals via an analog-to-digital converter.

13. The method of claim 9, wherein processing the received sensor cell samples comprises determining a correction factor that accounts for temporal variations in light intensity due to non-uniform brightness during the illumination period.

14. The method of claim 9, further comprising iteratively updating the calibration data by performing the calibration method at periodic calibration intervals during operation of the head-mounted display system component.

15. The method of claim 9, wherein the generated calibration data is stored in a nontransitory processor-readable storage medium integrated with the head-mounted display system.

16. A head-mounted display system for tracking positions of system components, comprising:
a light source configured to emit light during an illumination period;
an angle sensitive detector comprising a plurality of sensor cells configured to sequentially capture sensor cell samples during the illumination period, each sensor cell sample representing an intensity of light incident thereon;
control circuitry configured to:
initiate emission of light from the light source;
receive the sensor cell samples from the angle sensitive detector;

process the received sensor cell samples to determine calibration data that compensates for non-uniform brightness of the light source during the illumination period, the calibration data representing a characteristic slope of brightness variation over time; and track a position of a head-mounted display system component using the calibration data.

17. The head-mounted display system of claim 16, wherein the control circuitry is further configured to sequentially capture the sensor cell samples using a multiplexer coupled to the plurality of sensor cells.

18. The head-mounted display system of claim 16, wherein the control circuitry further comprises an analog-to-digital converter configured to convert the sensor cell samples into digital data.

19. The head-mounted display system of claim 16, wherein the control circuitry iteratively updates the calibration data by temporarily disabling the light source during a calibration period, capturing baseline sensor cell samples, and interpolating the captured sensor cell samples to generate updated calibration data.

20. The head-mounted display system of claim 16, wherein the calibration data is stored in a nontransitory processor-readable storage medium for subsequent use in tracking the position of the head-mounted display system component.

\* \* \* \* \*